United States Patent
Yasuda

(10) Patent No.: US 12,254,225 B2
(45) Date of Patent: Mar. 18, 2025

(54) INFORMATION PROCESSING APPARATUS HAVING PRINT SETTING CAPABILITY, CONTROL METHOD, AND STORAGE MEDIUM THEREFOR

(71) Applicant: CANON KABUSHIKI KAISHA, Tokyo (JP)

(72) Inventor: Akihiro Yasuda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/453,175

(22) Filed: Aug. 21, 2023

(65) Prior Publication Data

US 2024/0069818 A1   Feb. 29, 2024

(30) Foreign Application Priority Data

Aug. 24, 2022   (JP) .................................. 2022-133190

(51) Int. Cl.
   *G06F 3/12*   (2006.01)
(52) U.S. Cl.
   CPC .......... *G06F 3/1205* (2013.01); *G06F 3/1253* (2013.01)
(58) Field of Classification Search
   USPC ....................................................... 358/1.13
   See application file for complete search history.

(56) References Cited

U.S. PATENT DOCUMENTS

| | | | |
|---|---|---|---|
| 2011/0205584 A1 | 8/2011 | Ito | |
| 2019/0303076 A1* | 10/2019 | Kato | G06F 3/1286 |
| 2020/0004473 A1 | 1/2020 | Saigusa | |
| 2021/0200492 A1* | 7/2021 | Kawasaki | G06F 3/1228 |
| 2021/0326081 A1* | 10/2021 | Natori | G06F 3/1288 |

FOREIGN PATENT DOCUMENTS

| | | |
|---|---|---|
| DE | 102021117873 A1 | 1/2022 |
| EP | 3859515 A1 | 8/2021 |
| JP | 2008097573 A | 4/2008 |
| JP | 2021108001 A | 7/2021 |
| JP | 2021124790 A | 8/2021 |
| JP | 2021124791 A | 8/2021 |

* cited by examiner

*Primary Examiner* — Jacky X Zheng
(74) *Attorney, Agent, or Firm* — Canon U.S.A., Inc. IP Division

(57) ABSTRACT

A method for controlling an information processing apparatus that is to be executed by a print setting application installed in the information processing apparatus includes displaying, on a display unit, a first character string corresponding to predetermined capability information about a printer of a first printing method in a case where the printer of the first printing method is selected as a print data transmission destination, and displaying, on the display unit, a second character string corresponding to the predetermined capability information in a case where a printer of a second printing method is selected as the print data transmission destination.

16 Claims, 24 Drawing Sheets

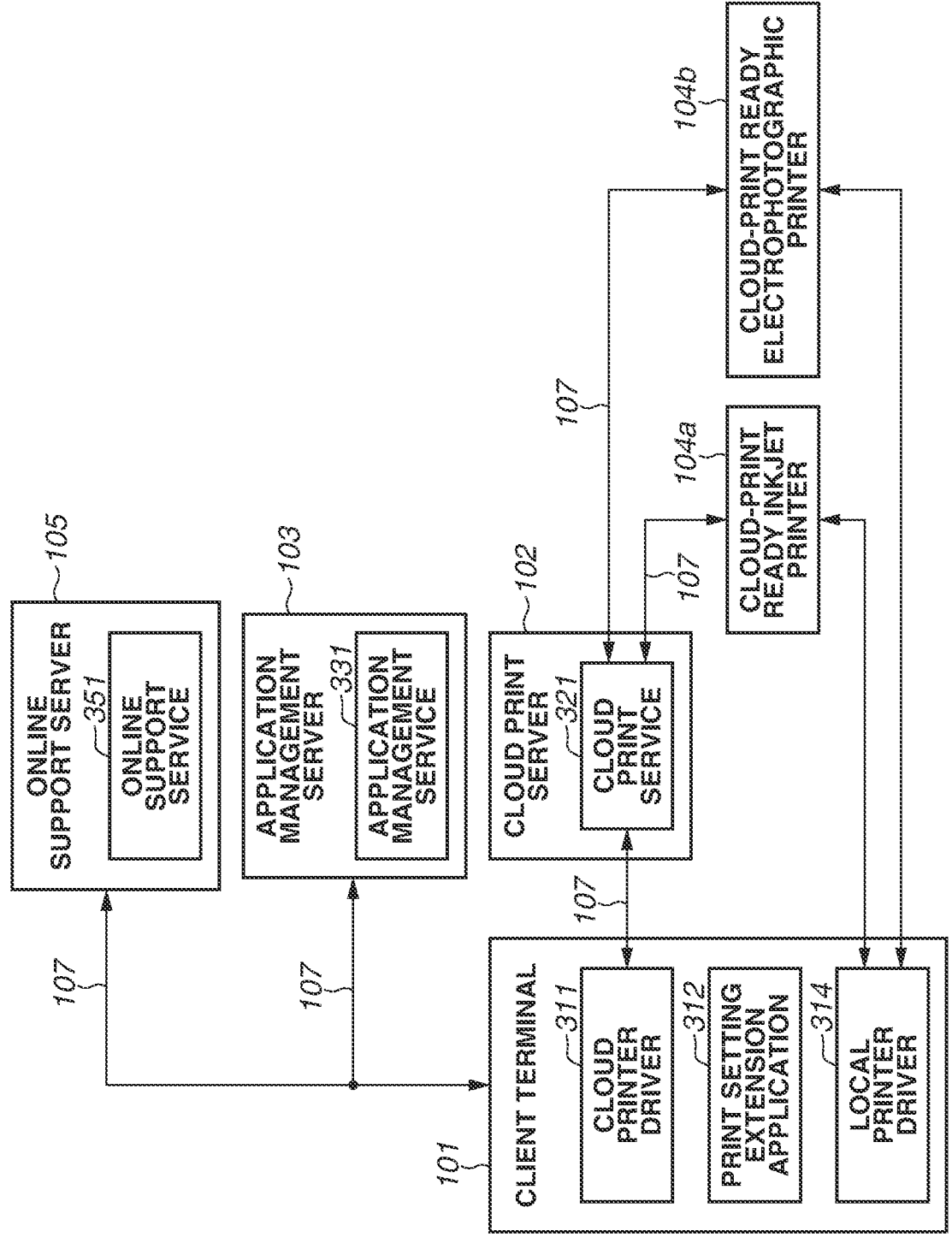

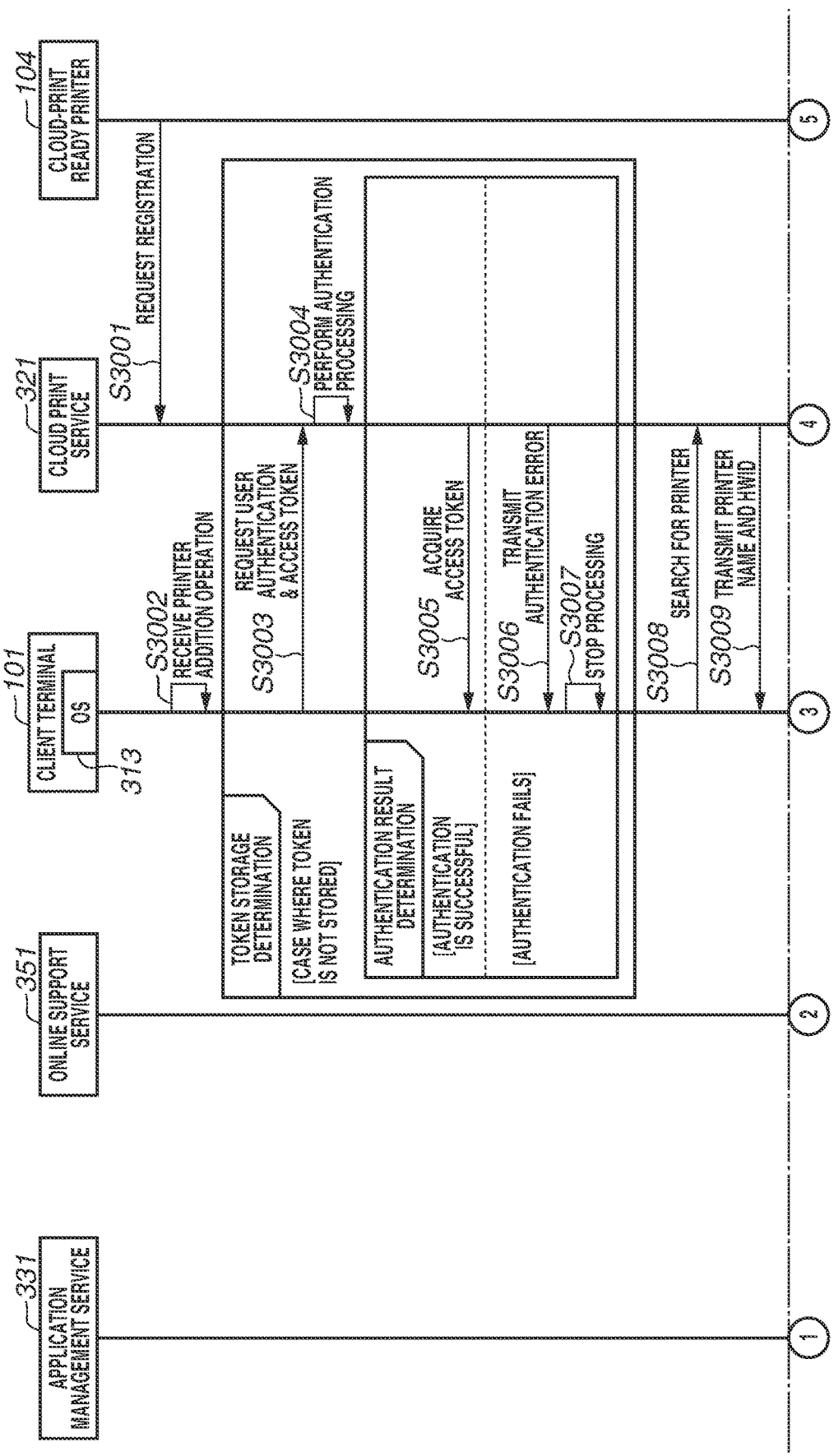

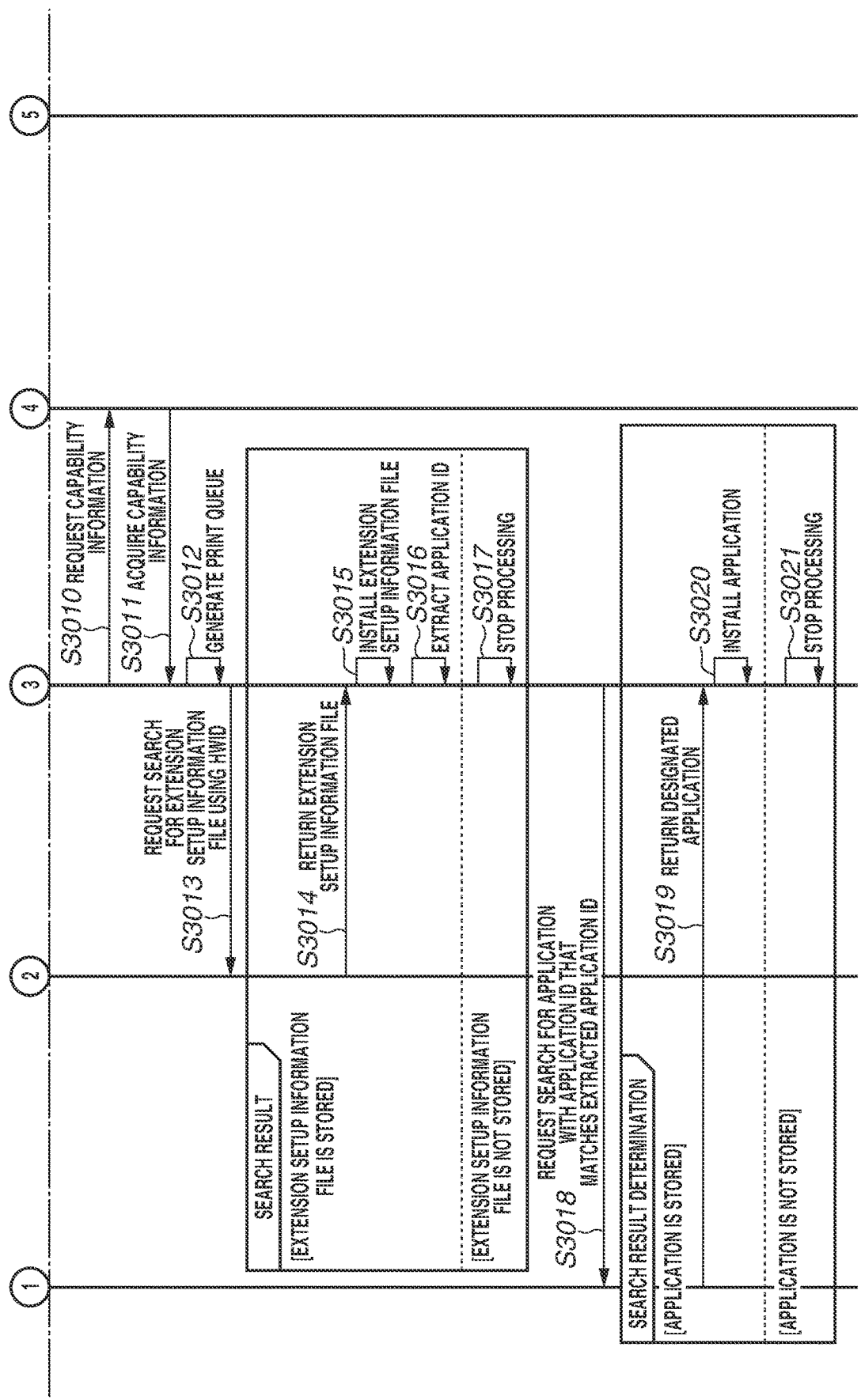

FIG.5A

| ITEM NAME | ATTRIBUTE VALUE |
|---|---|
| SHEET SIZE | A6/A5/A4/B5/LETTER/LEGAL/EXECUTIVE/JAPAN HAGAKI POSTCARD/#10 ENVELOPE PORTRAIT/DL ENVELOPE PORTRAIT/ENVELOPE (JAPAN YOU 4) PORTRAIT /ENVELOPE (JAPAN CHOU 3) PORTRAIT/ENVELOPE (JAPAN CHOU 4) PORTRAIT /ENVELOPE C5 PORTRAIT/ENVELOPE MONARCH PORTRAIT/L/4 × 6 (KG SIZE)/5 × 7 /JAPAN MUTSUGIRI (8 × 10)/SQUARE (127 mm)/NAME CARD (CARD) /ENVELOPE (JAPAN YOU 6) PORTRAIT/SQUARE (89 mm)/SQUARE (4 × 4) |
| SHEET TYPE | ENVELOPE/LABEL/PLAIN PAPER/PHOTO PAPER /POSTCARD FOR INKJET PHOTO PRINTING (COMMUNICATION SIDE) |
| NUMBER OF COPIES | MAX = 99 |
| SHEET ORIENTATION | PORTRAIT/LANDSCAPE |
| PRINT QUALITY | STANDARD/DRAFT |
| COLLATE COPIES INTO SETS | ON/OFF |
| STAPLING | OFF/AUTO/TOP LEFT/BOTTOM LEFT/TOP RIGHT/BOTTOM RIGHT/LEFT MARGIN (TWO POSITIONS)/TOP MARGIN (TWO POSITIONS)/RIGHT MARGIN (TWO POSITIONS) /BOTTOM MARGIN (TWO POSITIONS)/SADDLE-STITCH BINDING/STAPLE-FREE BINDING |
| PUNCHING | OFF/PUNCH HOLES (AUTO)/PUNCH HOLES (TWO HOLES AT LEFT) /PUNCH HOLES (THREE HOLES AT LEFT)/PUNCH HOLES (FOUR HOLES AT LEFT) /PUNCH HOLES (MULTI-HOLES AT LEFT)/PUNCH HOLES (TWO HOLES AT RIGHT) /PUNCH HOLES (THREE HOLES AT RIGHT)/PUNCH HOLES (FOUR HOLES AT RIGHT) /PUNCH HOLES (MULTI-HOLES AT RIGHT)/PUNCH HOLES (TWO HOLES AT TOP) /PUNCH HOLES (THREE HOLES AT TOP)/PUNCH HOLES (FOUR HOLES AT TOP) /PUNCH HOLES (MULTI-HOLES AT TOP)/PUNCH HOLES (TWO HOLES AT BOTTOM) /PUNCH HOLES (THREE HOLES AT BOTTOM)/PUNCH HOLES (FOUR HOLES AT BOTTOM) /PUNCH HOLES (MULTI-HOLES AT BOTTOM) |
| FOLD SETTING | OFF/FOLD IN TWO/C-FOLD/FOLD IN FOUR/ACCORDION Z-FOLD /Z-FOLD/SADDLE FOLD (OUTPUT FROM SADDLE FINISHER) |
| COLOR MODE | COLOR/MONOCHROME |
| N IN 1 | OFF/2 IN 1/4 IN 1/6 IN 1/9 IN 1/16 IN 1 |
| ARRANGEMENT ORDER | LEFT TO RIGHT/RIGHT TO LEFT |
| SCALE FACTOR | OFF/SCALE TO PAGE WIDTH/SCALE TO SCREEN SIZE |
| TWO-SIDED PRINTING | ONE-SIDED/TWO-SIDED |
| BINDING DIRECTION | LONG-SIDE BINDING/SHORT-SIDE BINDING |
| ROTATE 180 DEGREES | OFF/ROTATE LEFTWARD/ROTATE RIGHTWARD |
| STORE JOB IN PRINTER | ON/OFF |
| ABBREVIATE JOB NAME | ON/OFF |
| BORDERLESS PRINTING | ON/OFF |

FIG.5B

| ITEM NAME | ATTRIBUTE VALUE |
|---|---|
| SHEET SIZE | A6/A5/A4/B5/LETTER/LEGAL/EXECUTIVE/JAPAN HAGAKI POSTCARD/#10 ENVELOPE PORTRAIT/DL ENVELOPE PORTRAIT/ENVELOPE (JAPAN YOU 4) PORTRAIT /ENVELOPE (JAPAN CHOU 3) PORTRAIT/ENVELOPE (JAPAN CHOU 4) PORTRAIT /ENVELOPE C5 PORTRAIT/ENVELOPE MONARCH PORTRAIT/L/4 × 6 (KG SIZE)/5 × 7 /JAPAN MUTSUGIRI (8 × 10)/SQUARE (127 mm)/NAME CARD (CARD) /ENVELOPE (JAPAN YOU 6) PORTRAIT/MULTI-PURPOSE TRAY 120 × 120 mm/SQUARE (4 × 4) |
| SHEET TYPE | ENVELOPE/LABEL/PLAIN PAPER/PHOTO PAPER/THIN PAPER/HEAVY PAPER/BOND PAPER /OHP/PHOTO PAPER GLOSS STANDARD/PHOTO PAPER SEMI-GLOSS /POSTCARD FOR INKJET PRINTING (COMMUNICATION SIDE) /POSTCARD FOR INKJET PRINTING (ADDRESS SIDE) /POSTCARD FOR INKJET PHOTO PRINTING (COMMUNICATION SIDE) /POSTCARD FOR INKJET PHOTO PRINTING (ADDRESS SIDE) |
| NUMBER OF COPIES | MAX = 99 |
| SHEET ORIENTATION | PORTRAIT/LANDSCAPE |
| PRINT QUALITY | HIGH/STANDARD/DRAFT |
| COLLATE COPIES INTO SETS | ON/OFF |
| COLOR MODE | COLOR/MONOCHROME |
| FROM LAST PAGE | ON/OFF |
| SCALE FACTOR | OFF/SCALE TO PAGE WIDTH/SCALE TO SCREEN SIZE |
| TWO-SIDED PRINTING | ONE-SIDED/TWO-SIDED |
| BINDING DIRECTION | LONG-SIDE BINDING/SHORT-SIDE BINDING |
| ROTATE 180 DEGREES | OFF/ROTATE LEFTWARD/ROTATE RIGHTWARD |
| BORDERLESS PRINTING | ON/OFF |

FIG.6A

```xml
<?xml version="1.0" encoding="utf-8"?>
<PrintDeviceCapabilities
 xmlns:xsi="http://www.w3.org/2001/XMLSchema-instance"
 xmlns:xsd="http://www.w3.org/2001/XMLSchema"
 xmlns:xml="http://www.w3.org/XML/1998/namespace"
 xmlns:psk="http://schemas.microsoft.com/windows/2003/08/printing/printschemakeywords"
 xmlns:psk12="http://schemas.microsoft.com/windows/2013/12/printing/printschemakeywordsv12"
 xmlns:psf="http://schemas.microsoft.com/windows/2003/08/printing/printschemaframework"
 xmlns:psf2="http://schemas.microsoft.com/windows/2013/12/printing/printschemaframework2"
 xmlns="http://schemas.microsoft.com/windows/2013/12/printing/printschemaframework2"
 version="2">

<psk:JobCopiesAllDocuments psf2:psftype="ParameterDef">
      <psf:DataType xsi:type="xsd:QName" psf2:psftype="Property">xsd:integer</psf:DataType>
      <psf:DefaultValue xsi:type="xsd:integer" psf2:psftype="Property">1</psf:DefaultValue>
      <psf:Mandatory xsi:type="xsd:QName" psf2:psftype="Property">psk:Unconditional</psf:Mandatory>
      <psf:MaxValue xsi:type="xsd:integer" psf2:psftype="Property">999</psf:MaxValue>
      <psf:MinValue xsi:type="xsd:integer" psf2:psftype="Property">1</psf:MinValue>
      <psf:Multiple xsi:type="xsd:integer" psf2:psftype="Property">1</psf:Multiple>
      <psf:UnitType xsi:type="xsd:string" psf2:psftype="Property">copies</psf:UnitType>
  </psk:JobCopiesAllDocuments>

<psk:PageMediaSize psf2:psftype="Feature">
      <psk:ISOA4 psf2:psftype="Option">
          <psk12:PortraitImageableSize xsi:type="psf2:ImageableAreaType" psf2:psftype="Property">12700,12700,184600,271600</psk12:PortraitImageableSize>
          <psk:MediaSizeHeight xsi:type="xsd:integer" psf2:psftype="ScoredProperty">297000</psk:MediaSizeHeight>
          <psk:MediaSizeWidth xsi:type="xsd:integer" psf2:psftype="ScoredProperty">210000</psk:MediaSizeWidth>
      </psk:ISOA4>
      <psk:NorthAmericaLetter psf2:psftype="Option" psf2:default="true">
          <psk12:PortraitImageableSize xsi:type="psf2:ImageableAreaType" psf2:psftype="Property">12700,12700,190500,254000</psk12:PortraitImageableSize>
          <psk:MediaSizeHeight xsi:type="xsd:integer" psf2:psftype="ScoredProperty">279400</psk:MediaSizeHeight>
          <psk:MediaSizeWidth xsi:type="xsd:integer" psf2:psftype="ScoredProperty">215900</psk:MediaSizeWidth>
      </psk:NorthAmericaLetter>
  </psk:PageMediaSize>

<psk:PageOrientation psf2:psftype="Feature">
    <psk:Landscape psf2:psftype="Option"/>
    <psk:Portrait psf2:psftype="Option" psf2:default="true"/>
  </psk:PageOrientation>

<psk:PageBorderless psf2:psftype="Feature">
      <psk:None psf2:psftype="Option" psf2:default="true"/>
      <psk:Borderless psf2:psftype="Option"/>
  </psk:PageBorderless>

................

<psk:PageOutputColor psf2:psftype="Feature">
    <psk:Color psf2:psftype="Option" psf2:default="true">
        <psk:DeviceBitsPerPixel xsi:type="xsd:integer" psf2:psftype="ScoredProperty">24</psk:DeviceBitsPerPixel>
        <psk:DriverBitsPerPixel xsi:type="xsd:integer" psf2:psftype="ScoredProperty">24</psk:DriverBitsPerPixel>
    </psk:Color>
  </psk:PageOutputColor>
</PrintDeviceCapabilities>
```

FIG.6B-1

```xml
<?xml version="1.0" encoding="UTF-8"?>
<PrintDeviceCapabilities
  xmlns:ns0000="http://schemas.microsoft.com/windows/2018/04/printing/printschemakeywords/ipp"
  xmlns:xsi="http://www.w3.org/2001/XMLSchema-instance"
  xmlns:xsd="http://www.w3.org/2001/XMLSchema"
  xmlns:xml="http://www.w3.org/XML/1998/namespace"
  xmlns:psk="http://schemas.microsoft.com/windows/2003/08/printing/printschemakeywords"
  xmlns:psk11="http://schemas.microsoft.com/windows/2013/05/printing/printschemakeywordsv11"
  xmlns:psk12="http://schemas.microsoft.com/windows/2013/12/printing/printschemakeywordsv12"
  xmlns:psf="http://schemas.microsoft.com/windows/2003/08/printing/printschemaframework"
  xmlns:psf2="http://schemas.microsoft.com/windows/2013/12/printing/printschemaframework2"
  xmlns="http://schemas.microsoft.com/windows/2013/12/printing/printschemaframework2"
  version="2">

<!-- copies-default, copies-supported -->
  <psk:JobCopiesAllDocuments psf2:psftype="ParameterDef">
    <psf:DataType psf2:psftype="Property" xsi:type="xsd:QName">xsd:integer</psf:DataType>
    <psf:DefaultValue psf2:psftype="Property" xsi:type="xsd:integer">1</psf:DefaultValue>
    <psf:Mandatory psf2:psftype="Property" xsi:type="xsd:QName">psk:Unconditional</psf:Mandatory>
    <psf:MinValue psf2:psftype="Property" xsi:type="xsd:integer">1</psf:MinValue>
    <psf:MaxValue psf2:psftype="Property" xsi:type="xsd:integer">99</psf:MaxValue>
    <psf:Multiple psf2:psftype="Property" xsi:type="xsd:integer">1</psf:Multiple>
    <psf:UnitType psf2:psftype="Property" xsi:type="xsd:string">copies</psf:UnitType>
  </psk:JobCopiesAllDocuments>

<!-- media-default, media-supported, media-col-database -->
  <psk:PageMediaSize psf2:psftype="Feature">
    <psk:JapanHagakiPostcard psf2:psftype="Option" psf2:default="false">
      <psk:MediaSizeWidth xsi:type="xsd:integer" psf2:psftype="ScoredProperty">100000</psk:MediaSizeWidth>
      <psk:MediaSizeHeight xsi:type="xsd:integer" psf2:psftype="ScoredProperty">148000</psk:MediaSizeHeight>
      <psk12:PortraitImageableSize xsi:type="psf2:ImageableAreaType" psf2:psftype="Property">3400,5000,93200,136000</psk12:PortraitImageableSize>
      <psk12:BorderlessImageableSize xsi:type="psf2:ImageableAreaType" psf2:psftype="Property">0,0,100000,148000</psk12:BorderlessImageableSize>
    </psk:JapanHagakiPostcard>
    <psk:ISOA5 psf2:psftype="Option" psf2:default="false">
      <psk:MediaSizeWidth xsi:type="xsd:integer" psf2:psftype="ScoredProperty">148000</psk:MediaSizeWidth>
      <psk:MediaSizeHeight xsi:type="xsd:integer" psf2:psftype="ScoredProperty">210000</psk:MediaSizeHeight>
      <psk12:PortraitImageableSize xsi:type="psf2:ImageableAreaType" psf2:psftype="Property">3400,5000,141200,200000</psk12:PortraitImageableSize>
      <psk12:BorderlessImageableSize xsi:type="psf2:ImageableAreaType" psf2:psftype="Property">0,0,148000,210000</psk12:BorderlessImageableSize>
    </psk:ISOA5>
    <psk:ISOA4 psf2:psftype="Option" psf2:default="false">
      <psk:MediaSizeWidth xsi:type="xsd:integer" psf2:psftype="ScoredProperty">210000</psk:MediaSizeWidth>
      <psk:MediaSizeHeight xsi:type="xsd:integer" psf2:psftype="ScoredProperty">297000</psk:MediaSizeHeight>
      <psk12:PortraitImageableSize xsi:type="psf2:ImageableAreaType" psf2:psftype="Property">3400,5000,203200,287000</psk12:PortraitImageableSize>
      <psk12:BorderlessImageableSize xsi:type="psf2:ImageableAreaType" psf2:psftype="Property">0,0,210000,297000</psk12:BorderlessImageableSize>
    </psk:ISOA4>
    <psk:NorthAmericaLetter psf2:psftype="Option" psf2:default="true">
      <psk:MediaSizeWidth xsi:type="xsd:integer" psf2:psftype="ScoredProperty">215900</psk:MediaSizeWidth>
      <psk:MediaSizeHeight xsi:type="xsd:integer" psf2:psftype="ScoredProperty">279400</psk:MediaSizeHeight>
      <psk12:PortraitImageableSize xsi:type="psf2:ImageableAreaType" psf2:psftype="Property">6400,5000,203200,269400</psk12:PortraitImageableSize>
      <psk12:BorderlessImageableSize xsi:type="psf2:ImageableAreaType" psf2:psftype="Property">0,0,215900,279400</psk12:BorderlessImageableSize>
    </psk:NorthAmericaLetter>
    <psk:JapanYou4Envelope psf2:psftype="Option" psf2:default="false">
      <psk:MediaSizeWidth xsi:type="xsd:integer" psf2:psftype="ScoredProperty">105000</psk:MediaSizeWidth>
```

FIG.6B-2

```xml
        <psk:MediaSizeHeight xsi:type="xsd:integer" psf2:psftype="ScoredProperty">235000</psk:MediaSizeHeight>
        <psk12:PortraitImageableSize xsi:type="psf2:ImageableAreaType" psf2:psftype="Property">5600,8000,93800,214300</psk12:PortraitImageableSize>
        <psk12:BorderlessImageableSize xsi:type="psf2:ImageableAreaType" psf2:psftype="Property">0,0,105000,235000</psk12:BorderlessImageableSize>
    </psk:JapanYou4Envelope>
    <psk:NorthAmericaLegal psf2:psftype="Option" psf2:default="false">
        <psk:MediaSizeWidth xsi:type="xsd:integer" psf2:psftype="ScoredProperty">215900</psk:MediaSizeWidth>
        <psk:MediaSizeHeight xsi:type="xsd:integer" psf2:psftype="ScoredProperty">355600</psk:MediaSizeHeight>
        <psk12:PortraitImageableSize xsi:type="psf2:ImageableAreaType" psf2:psftype="Property">6400,5000,203200,345600</psk12:PortraitImageableSize>
        <psk12:BorderlessImageableSize xsi:type="psf2:ImageableAreaType" psf2:psftype="Property">0,0,215900,355600</psk12:BorderlessImageableSize>
    </psk:NorthAmericaLegal>
    <psk:JISB5 psf2:psftype="Option" psf2:default="false">
        <psk:MediaSizeWidth xsi:type="xsd:integer" psf2:psftype="ScoredProperty">182000</psk:MediaSizeWidth>
        <psk:MediaSizeHeight xsi:type="xsd:integer" psf2:psftype="ScoredProperty">257000</psk:MediaSizeHeight>
        <psk12:PortraitImageableSize xsi:type="psf2:ImageableAreaType" psf2:psftype="Property">3400,5000,175200,247000</psk12:PortraitImageableSize>
        <psk12:BorderlessImageableSize xsi:type="psf2:ImageableAreaType" psf2:psftype="Property">0,0,182000,257000</psk12:BorderlessImageableSize>
    </psk:JISB5>
</psk:PageMediaSize>

<!-- orientation-requested-default -->
<psk:PageOrientation psf2:psftype="Feature">
    <psk:Portrait psf2:psftype="Option" psf2:default="true"/>
    <psk:Landscape psf2:psftype="Option" psf2:default="false"/>
    <psk:ReverseLandscape psf2:psftype="Option" psf2:default="false"/>
</psk:PageOrientation>

............................

<!-- finishings-default, finishings-supported -->
<psk:JobStapleAllDocuments psf2:psftype="Feature">
    <psk:None psf2:psftype="Option" psf2:default="true"/>
    <psk:StapleTopLeft psf2:psftype="Option" psf2:default="false"/>
    <psk:StapleTopRight psf2:psftype="Option" psf2:default="false"/>
    <psk:StapleBottomLeft psf2:psftype="Option" psf2:default="false"/>
    <psk:StapleBottomRight psf2:psftype="Option" psf2:default="false"/>
    <psk:StapleDualLeft psf2:psftype="Option" psf2:default="false"/>
    <psk:StapleDualTop psf2:psftype="Option" psf2:default="false"/>
    <psk:StapleDualRight psf2:psftype="Option" psf2:default="false"/>
    <psk:StapleDualBottom psf2:psftype="Option" psf2:default="false"/>
    <psk:SaddleStitch psf2:psftype="Option" psf2:default="false"/>
</psk:JobStapleAllDocuments>

<!-- sides-default, sides-supported -->
<psk:JobDuplexAllDocumentsContiguously psf2:psftype="Feature">
    <psk:OneSided psf2:psftype="Option" psf2:default="true"/>
    <psk:TwoSidedShortEdge psf2:psftype="Option" psf2:default="false"/>
    <psk:TwoSidedLongEdge psf2:psftype="Option" psf2:default="false"/>
</psk:JobDuplexAllDocumentsContiguously>

<!-- print-color-mode-default, print-color-mode-supported, pwg-raster-document-type-supported -->
<psk:PageOutputColor psf2:psftype="Feature">
    <psk:Color psf2:psftype="Option" psf2:default="true"/>
    <psk:Grayscale psf2:psftype="Option" psf2:default="false"/>
    <psk:Monochrome psf2:psftype="Option" psf2:default="false"/>
</psk:PageOutputColor>
</PrintDeviceCapabilities>
```

FIG.7

```
[Version]
Signature = "$WIN NT$"
Class = Extension
ClassGuid = {e2f84ce7-8efa-411c-aa69-97454ca4cb57}
Provider = %ManufacturerName%
ExtensionId = {D4D9196A-105B-4B76-B693-84BD33A7A703}
CatalogFile = App.cat
DriverVer = 08/19/2020,16.35.13.542

[Manufacturer]
%ManufacturerName% = Ms, NTamd64.6.3

[Microsoft.NTamd64.6.3]
%Device.ExtensionDesc% = App-Install, %PrinterHardwareId%
%Device.ExtensionDesc% = App-Install, %PrinterHardwareId2%
%Device.ExtensionDesc% = App-Install, %PrinterHardwareId3%

[App-Install.NT]
AddProperty = Add-App-Property

[App-Install.NT.Software]
AddSoftware = %SoftwareName%,, Ms-App-SoftwareInstall

[Microsoft-App-SoftwareInstall]
SoftwareType = %MsStoreType%
SoftwareID = pfn://%PackageFamilyName%

[Add-App-Property]
{A925764B-88E0-426D-AFC5-B39768BE59EB}, 1, 0x12,, %AUMID%

[Strings]
ManufacturerName = "Ms"
SoftwareName = "CPrintApp"
PackageFamilyName = "PrinterApp_aaaaaaaaaaa8a"
AUMID = "PrinterApp_aaaaaaaaaaa8a!App"
Device.ExtensionDesc = "PrintApp"
MsStoreType = 2
PrinterHardwareId = "PrinterApp_device001"
```

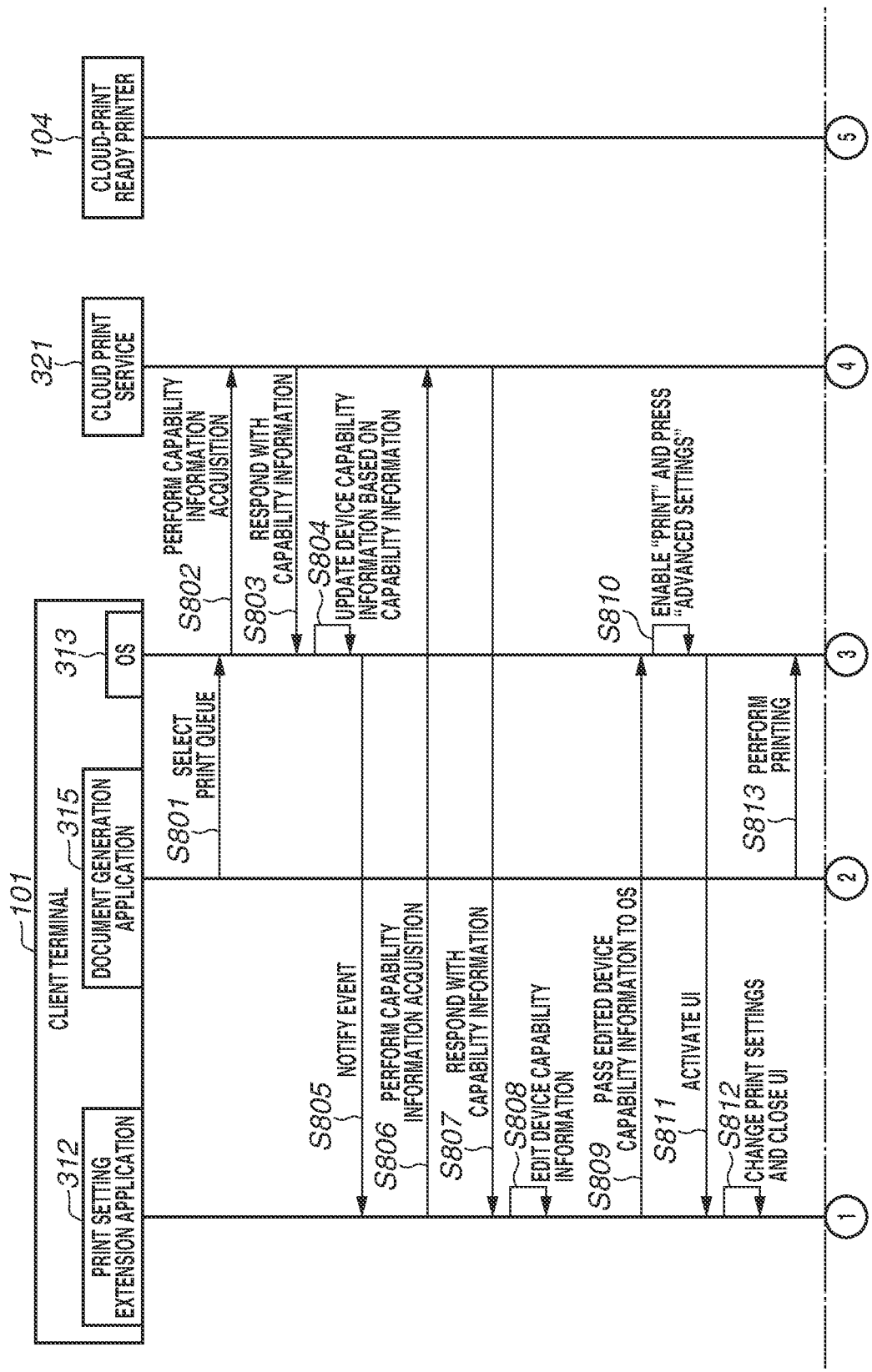

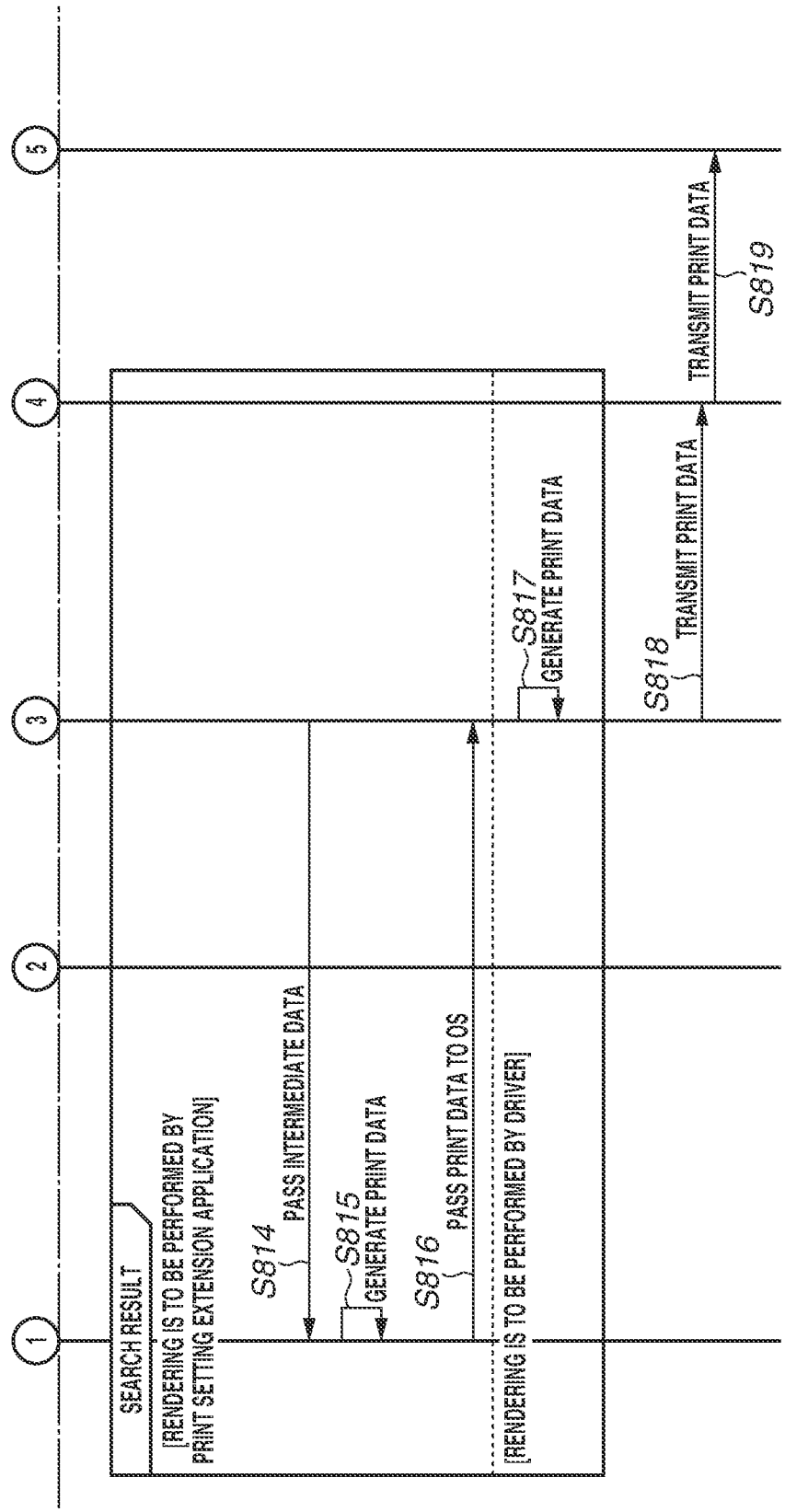

FIG.9A

PRINTING ORIENTATION
[PORTRAIT ▼]

TWO-SIDED PRINTING
[OFF ▼]

PAGE ORDER
[FORWARD ▼]

PRINT QUALITY
[STANDARD ▼]

[ADVANCED SETTINGS] — 901

[OK] [CANCEL] [APPLY]
 905    904     903

FIG.9B

SHEET SIZE
[A4 ▼]

NUMBER OF COPIES
[ONE]

COLOR PRINTING MODE
[COLOR ▼]

SHEET TYPE
[STANDARD ▼]

[OK] [CANCEL]
    902

FIG.9C

BORDERLESS PRINTING
[OFF ▼] — 906

RESOLUTION
[300 dpi ▼]

SCALING
[OFF ▼]

STAPLING
[OFF ▼]

[OK] [CANCEL]

FIG.9D

FOLD SETTING
[OFF ▼]

PUNCHING
[OFF ▼]

SHEET DISCHARGE UNIT
[AUTO ▼]

Nup
[2 ▼]

[OK] [CANCEL]

FIG.10A

OUTPUT SHEET SIZE
[A4 ▼]
SHEET TYPE
[PLAIN PAPER] ← 1001
NUMBER OF COPIES
[1]
SHEET ORIENTATION
● PORTRAIT  ○ LANDSCAPE
PRINT QUALITY
[STANDARD ▼]

[OK] [CANCEL]
1002

FIG.10B

N IN 1
[2 IN 1 ▼]
ARRANGEMENT ORDER
[LEFT TO RIGHT ▼]
SCALE FACTOR
[OFF ▼]
TWO-SIDED PRINTING
[ONE-SIDED ▼]
BINDING DIRECTION
[LONG-SIDE BINDING ▼]

[OK] [CANCEL]
1002

FIG.10C

COLLATE COPIES INTO SETS
[OFF ▼]
☑ BORDERLESS PRINTING ← 1003
RESOLUTION
[300 dpi ▼]
SCALING
[OFF ▼]
COLOR MODE
[COLOR ▼]

[OK] [CANCEL]
1002

FIG.10D

COLLATE COPIES INTO SETS
[OFF ▼]
☑ EXPAND PRINT REGION AND PRINT ← 1004
RESOLUTION
[300 dpi ▼]
SCALING
[OFF ▼]
COLOR MODE
[COLOR ▼]

[OK] [CANCEL]
1002

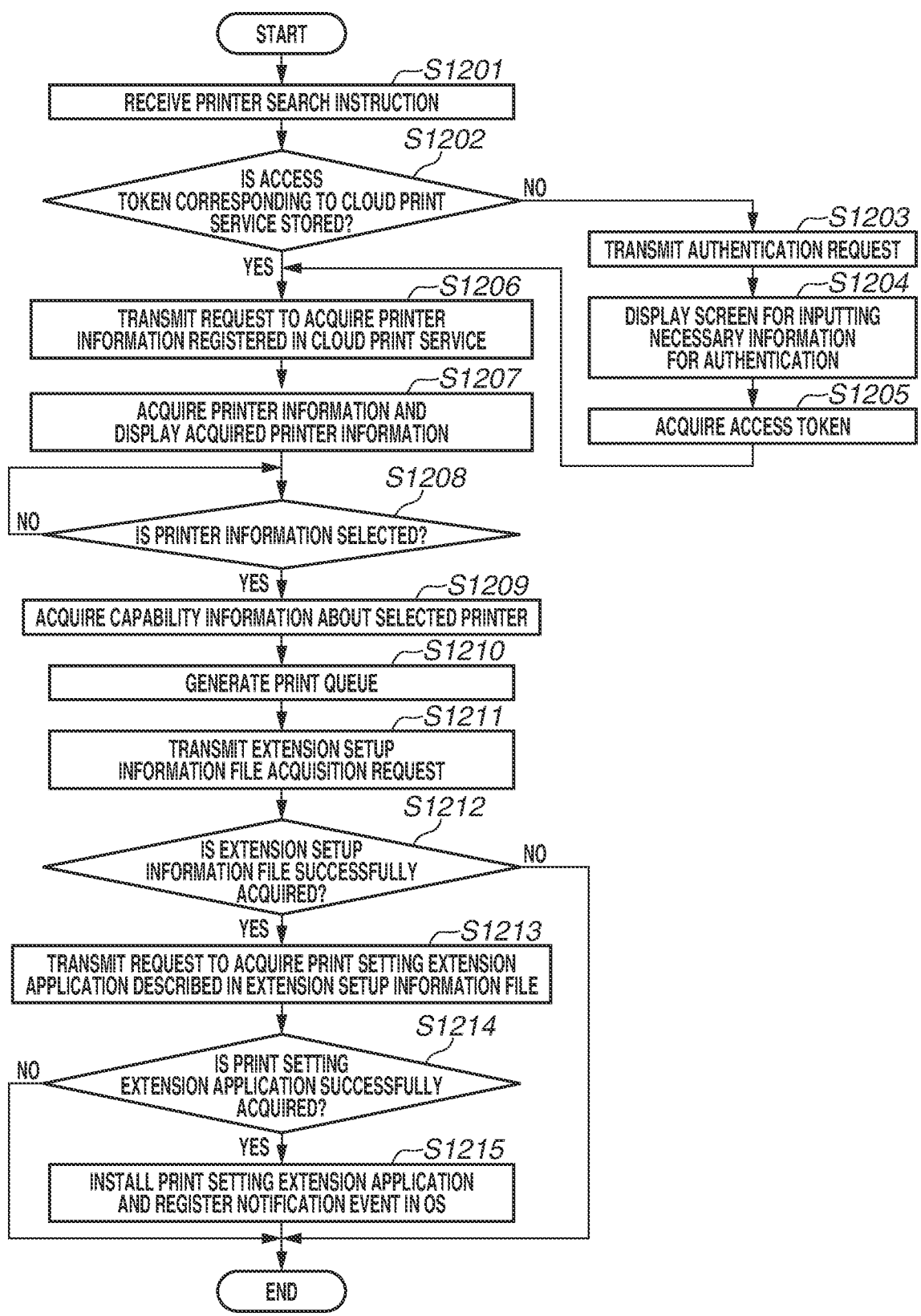

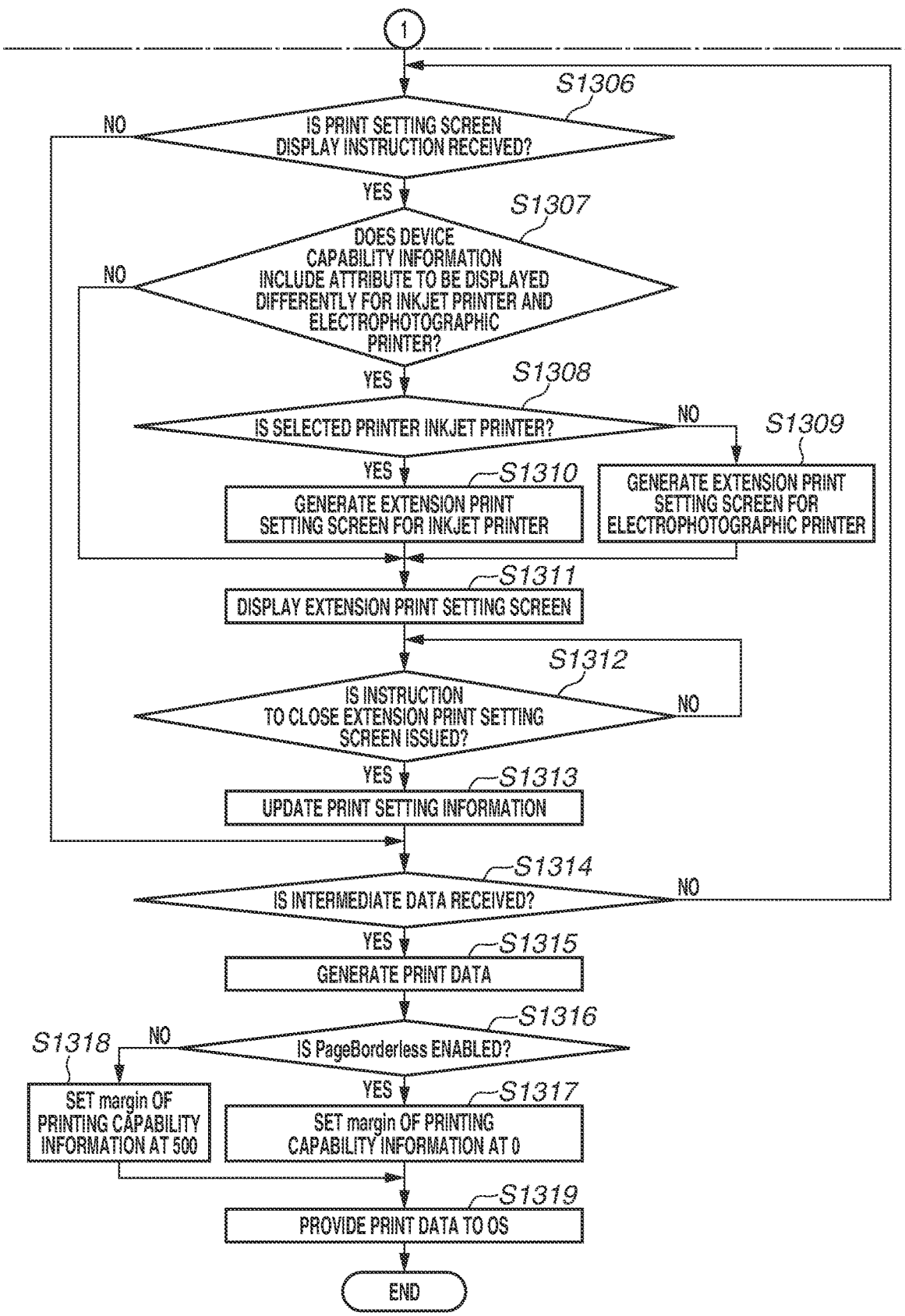

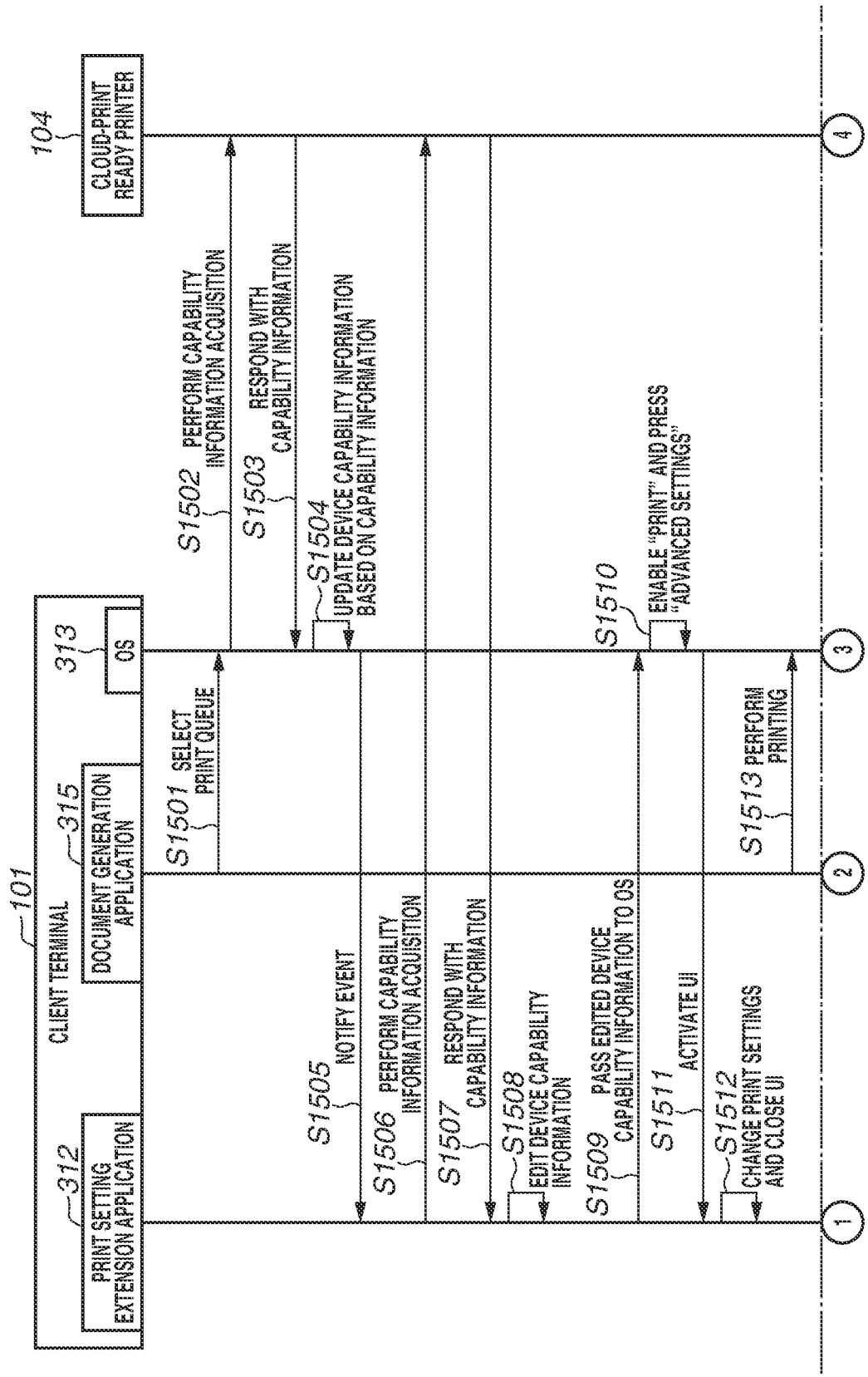

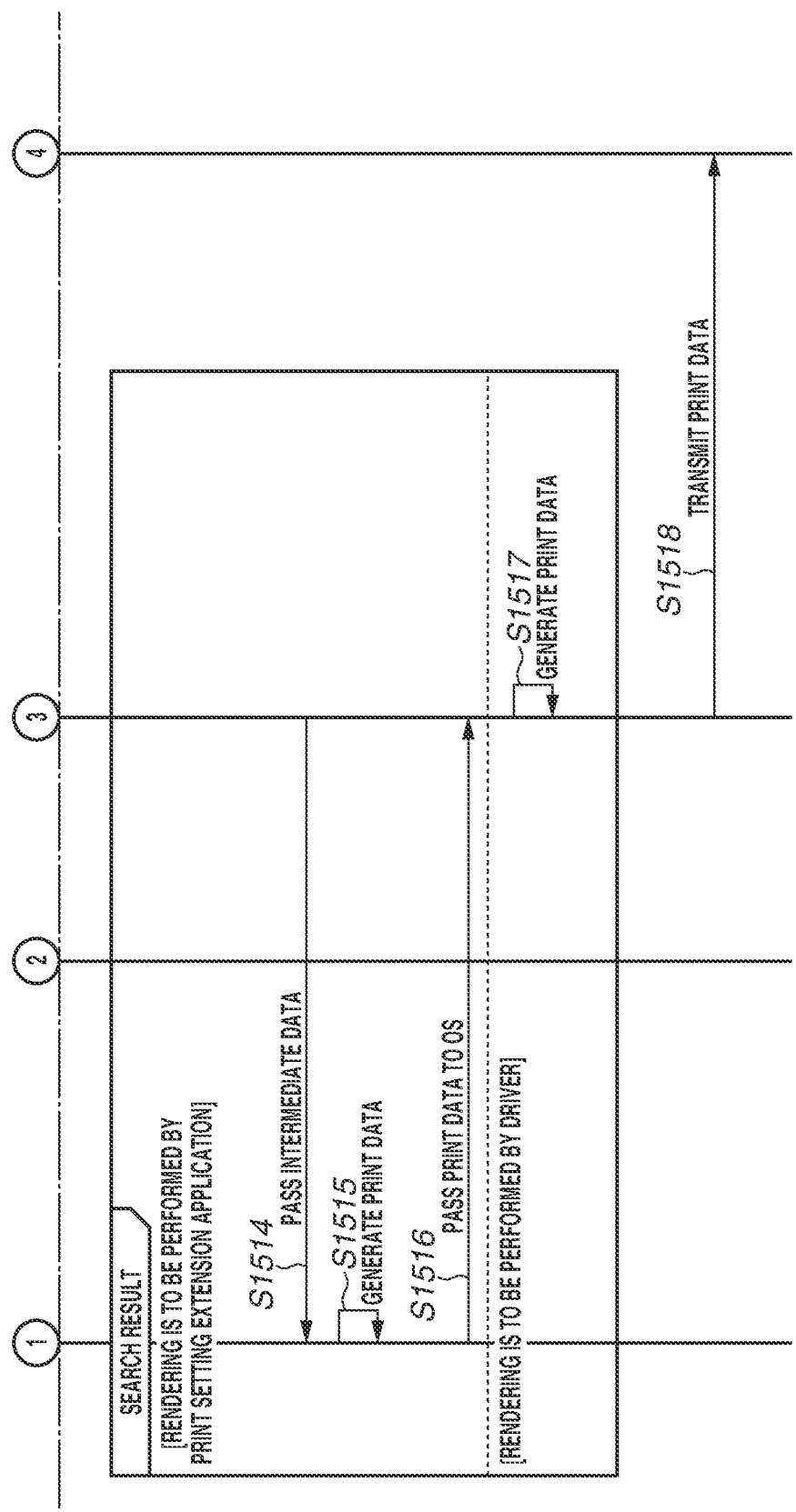

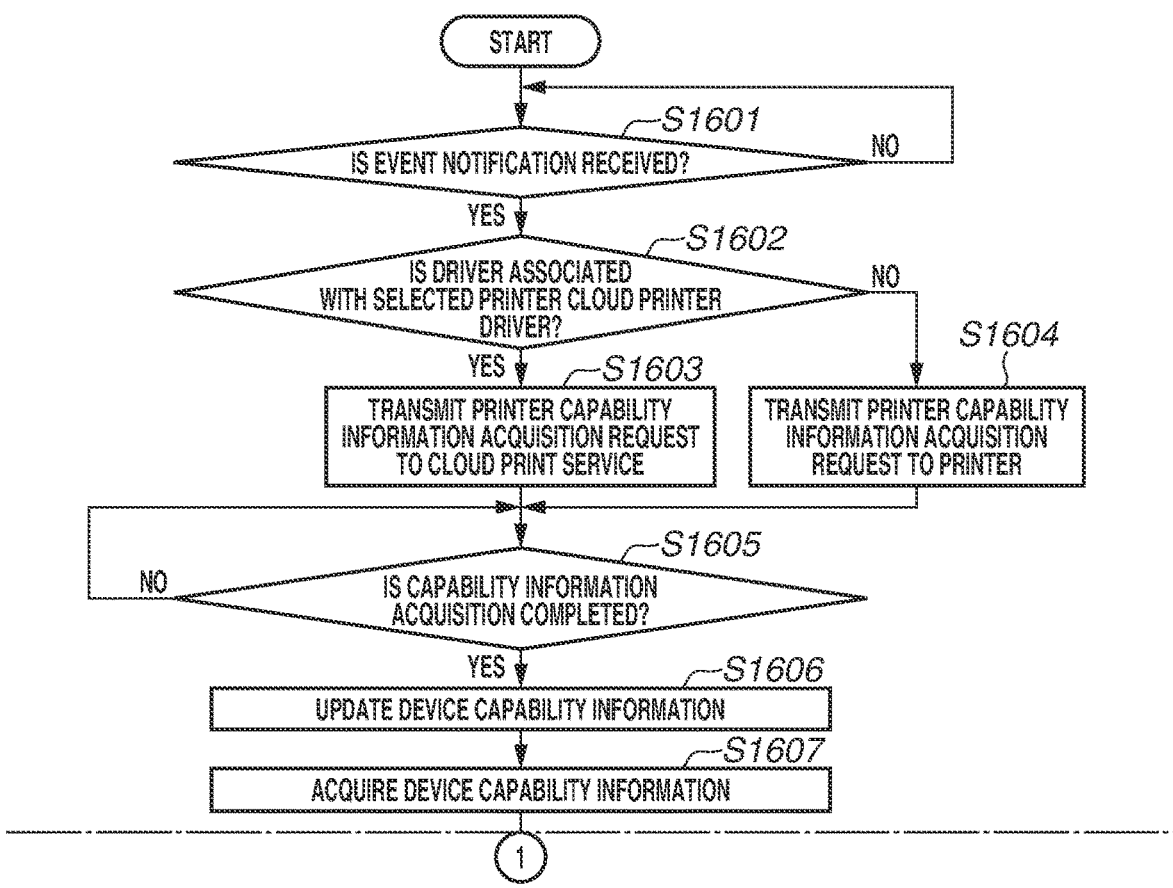

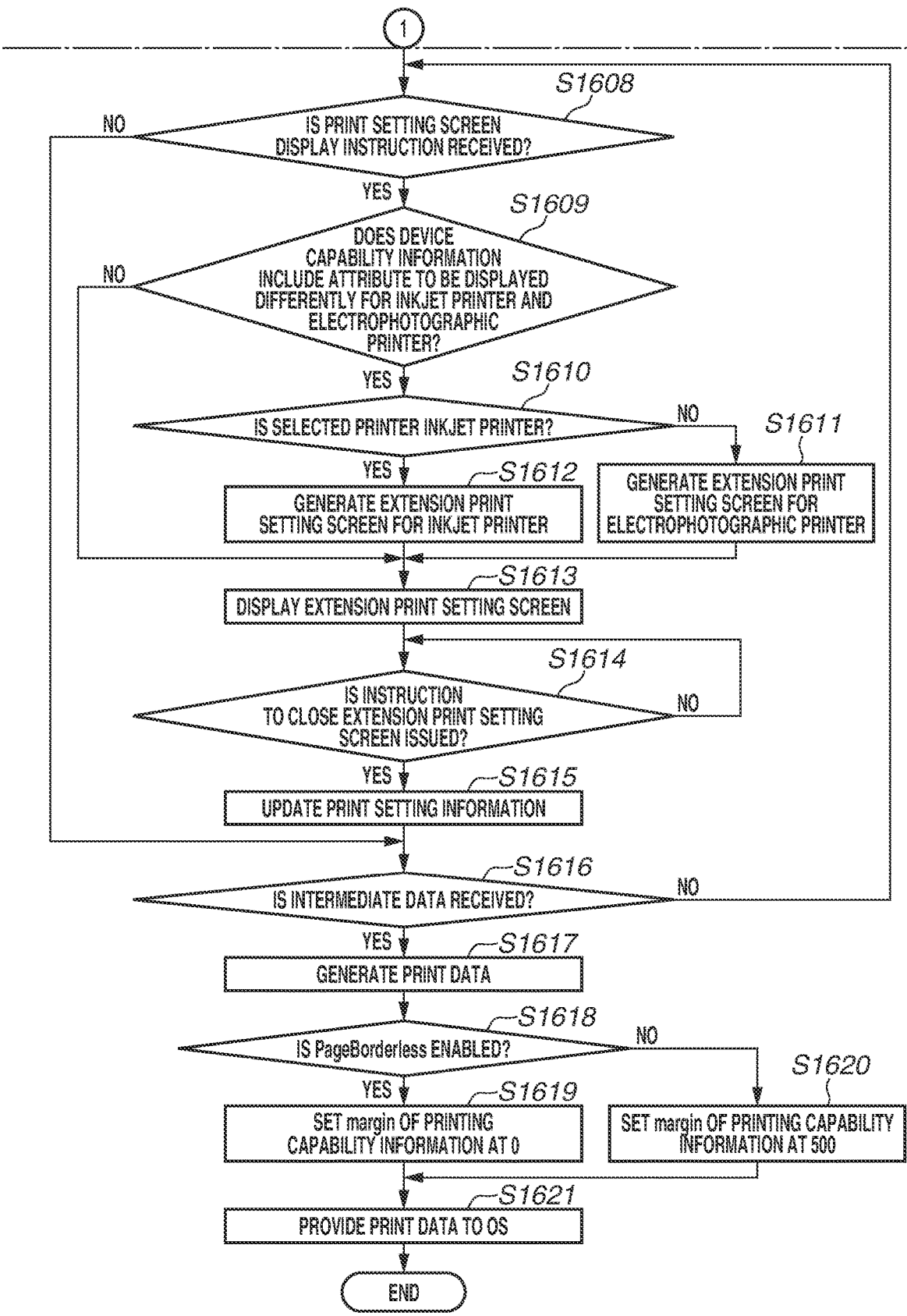

INFORMATION PROCESSING APPARATUS HAVING PRINT SETTING CAPABILITY, CONTROL METHOD, AND STORAGE MEDIUM THEREFOR

BACKGROUND OF THE INVENTION

Field of the Invention

The present invention relates to an information processing apparatus, a method for controlling the information processing apparatus, and a storage medium.

Description of the Related Art

In recent years, general-purpose printer drivers using an industry standard protocol such as the Internet Printing Protocol (IPP) have been discussed. The general-purpose printer drivers include a local printer driver configured to connect directly to a printer and a cloud printer driver configured to transmit print data to a cloud print service.

A general-purpose printer driver can communicate with a plurality of printers of a plurality of printer vendors. Thus, use of a general-purpose printer driver enables transmission of print data to an image forming apparatus or a cloud print service without necessitating a user installing a vendor-specific printer driver.

Since the general-purpose printer driver processes print jobs to be printed by various printers of various vendors, items that can be set as a print setting of the general-purpose printer driver and functions of the general-purpose printer driver are limited. Thus, as discussed in Japanese Patent Application Laid-Open No. 2021-124791, extending a print queue associated with a printer driver using identification information about a printer associated with the printer driver has been discussed. This makes it possible to realize a vendor-specific print setting user interface (vendor-specific print setting UI) and a print job editing function.

An industry standard such as IPP defines attributes for specifying capability information about a printer.

Even with an attribute defined by an industry standard, obtained outputs may differ depending on a model type or a printing method of a printer.

Meanwhile, a print setting screen provided by an operating system (OS) of an information processing apparatus displays a function name corresponding uniquely to the attribute regardless of the model type or the printing method of the printer. Thus, an output material different than an output indicated by the function name may be output depending on the model type or the printing method of the printer.

SUMMARY OF THE INVENTION

According to an aspect of the present invention, a method for controlling an information processing apparatus that is to be executed by a print setting application installed in the information processing apparatus includes displaying, on a display unit, a first character string corresponding to predetermined capability information about a printer of a first printing method in a case where the printer of the first printing method is selected as a print data transmission destination, and displaying, on the display unit, a second character string corresponding to the predetermined capability information in a case where a printer of a second printing method is selected as the print data transmission destination.

Further features of the present invention will become apparent from the following description of embodiments with reference to the attached drawings.

BRIEF DESCRIPTION OF THE DRAWINGS

FIG. 1 is a diagram illustrating an example of a print system according to a first embodiment.

FIGS. 3A and 3B are diagrams illustrating an example of a sequence of a process of installing a print setting extension application according to the first embodiment.

FIG. 5A is a diagram illustrating an example of configuration information stored in an electrophotographic printer according to the first embodiment.

FIG. 5B is a diagram illustrating an example of configuration information stored in an inkjet printer according to the first embodiment.

FIG. 6A is a diagram illustrating an example of device configuration information about a device included in an operating system (OS) according to the first embodiment.

FIGS. 6B-1 and 6B-2 are diagrams illustrating an example of the device configuration information extended using information acquired from a cloud print service according to the first embodiment.

FIG. 7 is a diagram illustrating an example of an extension setup information file acquired from an online support service according to the first embodiment.

FIGS. 8A and 8B are diagrams illustrating an example of a sequence of a process by which print settings are configured using a print setting extension application and print data is transmitted via the cloud according to the first embodiment.

FIGS. 9A to 9D are diagrams each illustrating an example of a print setting screen that is displayed in a case where no print setting extension application is installed according to the first embodiment.

FIGS. 10A to 10D are diagrams each illustrating an example of a print setting screen that is displayed in a case where the print setting extension application is installed according to the first embodiment.

FIG. 12 is a flowchart illustrating a process for installing the print setting extension application in a client terminal according to the first embodiment.

FIGS. 13A and 13B are diagrams illustrating a flowchart illustrating a process of generating print data according to the first embodiment.

FIGS. 15A and 15B are diagrams illustrating an example of a sequence of a process by which print settings are configured using a print setting extension application and print data is transmitted directly to a printer according to a second embodiment.

FIGS. 16A and 16B are diagrams illustrating a flowchart illustrating a process of generating print data according to the second embodiment.

DESCRIPTION OF THE EMBODIMENTS

Figure 2A:
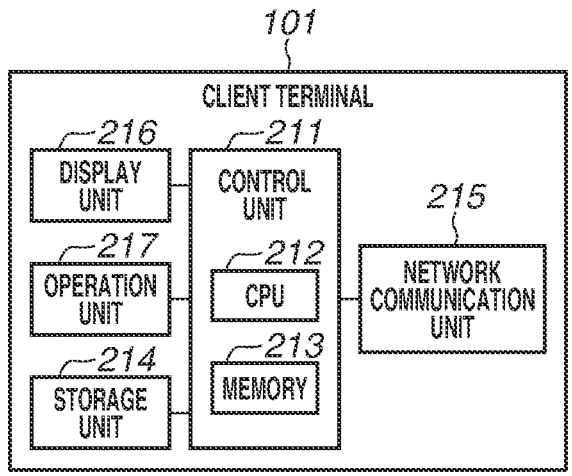
FIGS. 2A to 2E are diagrams each illustrating an example of a hardware configuration of an information processing apparatus or an image forming apparatus according to the first embodiment.

Various embodiments of the present invention will be described below with reference to the drawings.

FIG. 1 is a diagram illustrating a configuration of a print system for cloud printing according to a first embodiment. A client terminal 101, a cloud print server 102, and an application management server 103 are connected together via a network 107. Further, a cloud-print ready inkjet printer 104a, a cloud-print ready electrophotographic printer 104b, and an online support server 105 are also connected via the network 107. Hereinafter, the cloud-print ready inkjet printer 104a will be referred to as "inkjet printer 104a". Further, the cloud-print ready electrophotographic printer 104b will be referred to as "electrophotographic printer 104b". Further, the cloud-print ready inkjet printer 104a and the cloud-print ready electrophotographic printer 104b are sometimes collectively referred to as "cloud-print ready printer 104".

A cloud printer driver 311 is installed in the client terminal 101. The cloud printer driver 311 is a printer driver capable of generating print data to be transmitted to the cloud-print ready printer 104 via a cloud print service 321.

Further, a local printer driver 314 is installed in the client terminal 101. The local printer driver 314 is a printer driver capable of generating print data to be transmitted to a printer connected directly to the client terminal 101.

According to the present embodiment, the cloud printer driver 311 and the local printer driver 314 are drivers that are pre-installed in an operating system (OS) of the client terminal 101 and do not need to be installed by a user. Further, the cloud printer driver 311 and the local printer driver 314 are printer drivers that generate print data in compliance with a predetermined protocol. Thus, the cloud printer driver 311 and the local printer driver 314 are printer drivers capable of generating print data printable by a plurality of different printers of a plurality of different vendors that supports a print service provided by the cloud print service 321 and a print service provided by the local printer driver 314.

Further, a print setting extension application 312 is installed in the client terminal 101 by a method described below. The print setting extension application 312 is a print setting application for extending a function of a print setting for print data to be transmitted to a printer associated with the cloud printer driver 311 or the local printer driver 314.

While one client terminal 101, one inkjet printer 104a, and one electrophotographic printer 104b are illustrated in FIG. 1, a plurality of client terminals 101, a plurality of inkjet printers 104a, and a plurality of electrophotographic printers 104b can be included in the print system.

Further, the cloud print server 102, the application management server 103, and the online support server 105 can be a server system formed by a plurality of information processing apparatuses. By configuring each server as a server system including a plurality of information processing apparatuses, loads can be distributed to the plurality of information processing apparatuses.

Further, the cloud print server 102, the application management server 103, and the online support server 105 can be configured virtually in a physically-single information processing apparatus.

While the network 107 is intended to connect to the cloud services via a wide area network (WAN) such as the Internet, the network 107 can be a network in a closed environment such as a corporate local area network (cooperate LAN).

The client terminal 101 is an information processing apparatus, such as a personal computer (PC), a tablet, or a smartphone, and is a terminal that is operated directly by the user. Any application software can be executed on the client terminal 101.

The inkjet printer 104a and the electrophotographic printer 104b are devices that perform actual printing on recording media, such as sheets, and are image forming apparatuses that convert print data received via the network 107 into image data and print the image data. The inkjet printer 104a and the electrophotographic printer 104b are printers of different printing methods.

The inkjet printer 104a and the electrophotographic printer 104b receive print data generated by the cloud printer driver 311 of the client terminal 101 via the cloud print server 102. Further, the inkjet printer 104a and the electrophotographic printer 104b receive print data generated by the local printer driver 314 of the client terminal 101 without using the cloud print server 102.

The cloud print server 102 receives print instructions and print data from external sources. Then, the cloud print server 102 transmits the received print data to the inkjet printer 104a and the electrophotographic printer 104b.

The application management server 103 holds and manages various applications.

The application management server 103 receives application identification information and a download request from the client terminal 101 and transmits an application identified based on the received identification information to the client terminal 101.

The online support server 105 is a server apparatus that provides an online support service 351. The online support service 351 is a service for providing, to the client terminal 101, an extension setup information file describing information for extending a function of the client terminal 101.

Next, hardware configurations of the apparatuses included in the system according to the present embodiment will be described below with reference to FIGS. 2A to 2E.

FIG. 2A is a block diagram illustrating a hardware configuration of the client terminal 101.

The client terminal 101 includes a display unit 216, an operation unit 217, a storage unit 214, a control unit 211, and a network communication unit 215.

The storage unit 214 is a non-volatile storage apparatus such as a hard disk or a solid state drive (SSD). Digital data can be stored in the storage unit 214, and the stored digital data is rewritable.

The control unit 211 includes a central processing unit (CPU) 212 and a memory 213 and controls entire operations of the client terminal 101. The CPU 212 loads programs stored in the storage unit 214 to the memory 213 and executes the loaded programs. The memory 213 is a main storage memory of the CPU 212 and is used as a work area and a temporary storage area for loading various programs. The CPU 212 of the client terminal 101 performs display control to display an extension print setting screen based on a program of the print setting extension application 312.

The network communication unit 215 is an apparatus that communicates with the external network 107, and digital data is communicated between the network communication unit 215 and external servers and external client terminals via the network 107.

Figure 2B:
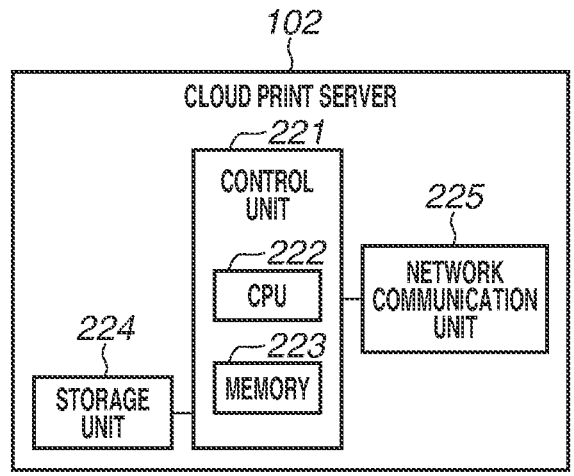

The display unit 216 is an apparatus, such as a liquid crystal display, for displaying visual information to the user. The operation unit 217 is an apparatus for receiving user inputs via a keyboard or a mouse. An apparatus having both functions of the display unit 216 and the operation unit 217, such as a touch panel, can be used FIG. 2B is a block diagram illustrating a hardware configuration of the cloud print server 102. The cloud print server 102 includes a storage unit 224, a control unit 221, and a network communication unit 225.

Since the storage unit 224, the control unit 221, and the network communication unit 225 are similar to the corresponding units of the client terminal 101, redundant descriptions thereof are omitted.

While the cloud print server 102 is described as a single information processing apparatus having the hardware configuration illustrated in FIG. 2B, the cloud print server 102 can be formed by a plurality of information processing apparatuses having the hardware configuration illustrated in FIG. 2B.

Figure 2C:
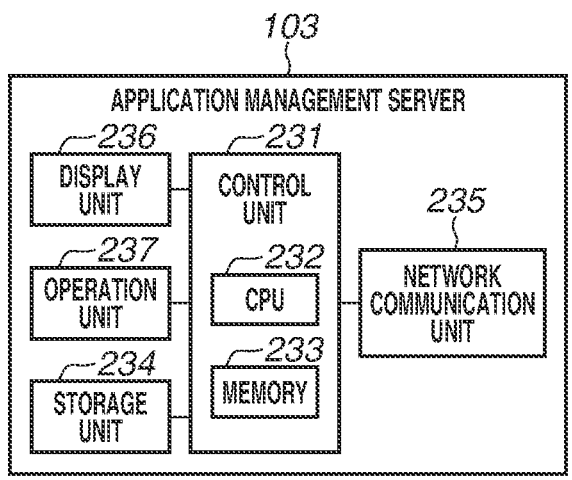

FIG. 2C is a block diagram illustrating a hardware configuration of the application management server 103. The application management server 103 includes a display unit 236, an operation unit 237, a storage unit 234, a control unit 231, and a network communication unit 235.

Since the display unit 236, the operation unit 237, the storage unit 234, the control unit 231, and the network communication unit 235 are similar to the corresponding units of the client terminal 101, redundant descriptions thereof are omitted.

While the application management server 103 is described as a single information processing apparatus having the hardware configuration illustrated in FIG. 2C, the application management server 103 can be formed by a plurality of information processing apparatuses.

Figure 2D:
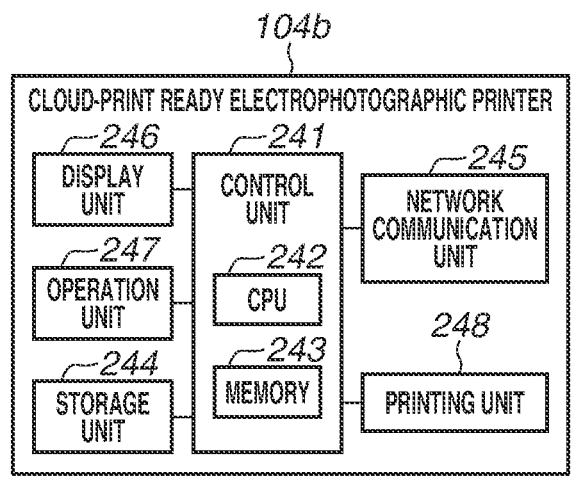

FIG. 2D is a block diagram illustrating a hardware configuration of the electrophotographic printer 104b.

The electrophotographic printer 104b includes a display unit 246, an operation unit 247, a storage unit 244, a control unit 241, a network communication unit 245, and a printing unit 248.

The display unit 246 is an apparatus for displaying information to the user, such as a touch panel or a light emitting diode (LED) built in the electrophotographic printer 104b.

The operation unit 247 is an apparatus for receiving user inputs and may include hardware keys such as a numeric keypad in addition to a touch panel. Since the storage unit 244 and the control unit 241 are similar to the corresponding units of the client terminal 101, redundant descriptions thereof are omitted.

The network communication unit 245 is an apparatus that communicates with the external network 107 and has a role of mainly receiving print data and transmitting a state of the electrophotographic printer 104b, such as an error, to an external server.

The printing unit 248 is an apparatus that performs printing processing by performing a series of operations of feeding a sheet placed in a cassette or on a tray, performing printing on the sheet, and discharging the sheet. According to the present embodiment, the electrophotographic printer 104b is a printer that uses an electrophotographic method as a printing method. Further, a finisher having a function of punching sheets to be discharged and stapling sheets to be discharged is connected to the electrophotographic printer 104b.

A hardware configuration of the inkjet printer 104a will be described below with reference to FIG. 2D. Only a configuration that is different than the configuration of the electrophotographic printer 104b will be described below. A printing unit of the inkjet printer 104a uses an inkjet method as a printing method.

Further, the inkjet printer 104a may not have a storage function, and in this case, the inkjet printer 104a may not be mounted with the storage unit 244.

While a single-function printer that performs only a print function is described as an example of the cloud-print ready printer 104 according to the present embodiment, a multi-function printer (multi-function peripheral) that further includes a scanner function and a fax function can be used.

Figure 2E:
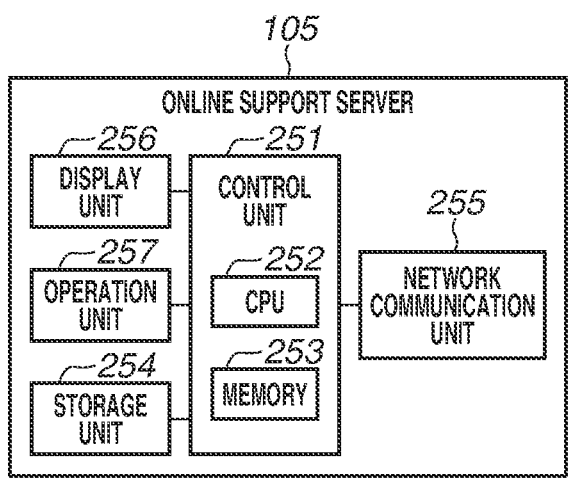

FIG. 2E is a block diagram illustrating a hardware configuration of the online support server 105. While the online support server 105 according to according to the present embodiment is described as being formed by a single information processing apparatus, the online support server 105 can be formed by a plurality of information processing apparatuses. The online support server 105 includes a display unit 256, an operation unit 257, a storage unit 254, a control unit 251, and a network communication unit 255. Since the display unit 256 and the operation unit 257 are respectively similar to the display unit 216 and the operation unit 217 of the client terminal 101, redundant descriptions thereof are omitted. The storage unit 254 is a memory device such as a hard disk drive (HDD) or a SSD. The storage unit 254 stores an extension setup information file that is a file describing information for extending a function provided by the client terminal 101.

The control unit 251 includes a CPU 252 and a memory 253. The CPU 252 controls the entire online support server 105. The memory 253 is used in processing performed by the CPU 252. The network communication unit 255 is an interface via which the online support server 105 communicates with the client terminal 101. The online support server 105 receives a request to acquire a file stored in the storage unit 254 via the network communication unit 255 and transmits the corresponding file to the client terminal 101 via the network communication unit 255.

Next, a sequence of a process by which information about the cloud-print ready printer 104 is registered with the cloud print service 321 and printing is executed from the client terminal 101 according to the present embodiment will be described below with reference to FIGS. 3A and 3B. Since this process applies to both a case where the inkjet printer 104a is used and a case where the electrophotographic printer 104b is used, the inkjet printer 104a and the electrophotographic printer 104b will be referred to collectively as the cloud-print ready printer 104 in the description below.

First, the cloud-print ready printer 104 receives, from the user, a printer registration operation for registering the cloud-print ready printer 104 with the cloud print service 321. In step S3001, the cloud-print ready printer 104 transmits a printer registration request together with device identification information about the cloud-print ready printer 104 to the cloud print service 321. The device identification information transmitted to the cloud print service 321 herein is, for example, a hardware identifier (HWID) assigned to each printer model type. The device identification information can be any information from which a printer model type is identifiable. For example, a compatible identifier (CID) indicating printer type information can be used.

The cloud print service 321 having received the registration request transmits a uniform resource locator (URL) of the cloud print service 321 for the printer registration to the cloud-print ready printer 104. In a case where the user accesses the URL from the cloud-print ready printer 104 or an information processing apparatus, an input screen for inputting a user identifier (user ID) and a password is displayed on the display unit of the terminal from which the user has accessed the URL. The user inputs the user ID and the password for using the cloud print service 321 and logs in to the cloud print service 321. In a case where the user successfully logs in to the cloud print service 321, the cloud print service 321 transmits a request to acquire necessary information for the printer registration to the cloud-print ready printer 104. The cloud-print ready printer 104 transmits printer information to the cloud print service 321 in response to the request.

Next, the cloud print service 321 having received the printer registration request registers the information about the cloud-print ready printer 104 and generates a print queue for the cloud-print ready printer 104. At this time, the cloud print service 321 acquires capability information about the cloud-print ready printer 104 and stores the acquired capability information in association with the generated print queue. The capability information is information indicating the functions included in the cloud-print ready printer 104 and specifies information that the user needs to configure print settings in printing, such as information about whether two-sided-printing is enabled, color-printing information about whether color-printing is enabled, and information about whether stapling is enabled. Further, in registering the capability information according to the present embodiment, the cloud-print ready printer 104 registers information indicating that the cloud-print ready printer 104 is an inkjet printer or an electrophotographic printer with the cloud print service 321.

FIG. 5A is a diagram illustrating an example of capability information about the electrophotographic printer 104b. The capability information is information that is different for each printer. The capability information consists of item names and attribute values. Each item name corresponds to a setting item of the print settings. Each attribute value corresponds to a setting value, an option, or a value range that can be set for the corresponding setting item. The cloud-print ready printer 104 stores item names and attribute values that are uniquely defined by the printer vendor, in addition to item names and attribute values that are defined as industry standard specifications by IPP. For example, the item names "store job in printer", "abbreviate job name", and "staple-free binding" and attribute values associated with the foregoing item names in FIG. 5 are item names and attribute values that are uniquely defined by the printer vendor. The setting item "store job in printer" is a setting item for setting whether print data that the electrophotographic printer 104b receives from the cloud print service 321 is to be stored in the electrophotographic printer 104b after the print data is printed. The setting item "abbreviate job name" is a setting item for setting whether a name assigned to print data that the electrophotographic printer 104b receives from the cloud print service 321 is to be abbreviated and the abbreviated name is to be displayed in displaying bibliographic information about the print data on the display unit 246 of the electrophotographic printer 104b. The setting item "staple-free binding" is an item for setting whether output sheets based on print data that the electrophotographic printer 104b receives from the cloud print service 321 are to be bound together without using staples. Binding sheets without using staples indicates that the sheets are to be bound together by, for example, crimping. An attribute value specific to the printer vendor can be defined as an attribute value corresponding to an item name defined as the industry standard specifications. For example, "fold setting" is an item name defined by IPP. Meanwhile, "saddle fold", which is one of the attribute values of "fold setting", is a function of folding one or more sheets together without binding the sheets using staples and discharging the folded sheets and is an attribute value that is uniquely defined by the printer vendor. FIG. 5B illustrates capability information about the inkjet printer 104a. The capability information about the inkjet printer 104a includes a sheet type and a sheet size that are not included in the capability information about the electrophotographic printer 104b. On the other hand, the capability information about the inkjet printer 104a does not include the settings related to finishing, such as stapling, punching, and fold setting, that are included in the capability information about the electrophotographic printer 104b.

According to the present embodiment, capability information is notified to the cloud print service 321 in compliance with IPP as a communication protocol. The cloud-print ready printer 104 registers the capability information using commands that are prepared for the cloud-print ready printer 104 to register the capability information with the cloud print service 321. The cloud-print ready printer 104 notifies the cloud print service 321 of the item names illustrated in FIG. 5A or 5B, the attribute values corresponding to the item names, and default values. The capability information to be notified herein does not depend on whether the items and the attribute values are defined by IPP. For example, the item names "store job in printer", "abbreviate job name", and "staple-free binding" and the attribute values of the item names in FIG. 5A are also notified to the cloud print service 321. Further, "saddle fold", which is one of the attribute values of "fold setting" and is an attribute value specific to the printer vendor, is also registered as an attribute value of "fold setting" with the cloud print service 321.

Next, a description will be given of installation of the print setting extension application 312 that is performed in a case where the user performs a setup operation on the client terminal 101 to print using the cloud-print ready printer 104. In registering the cloud-print ready printer 104 with the client terminal 101, a standard print function that is one of the functions of an OS 313 of the client terminal 101 is used.

Figure 4:
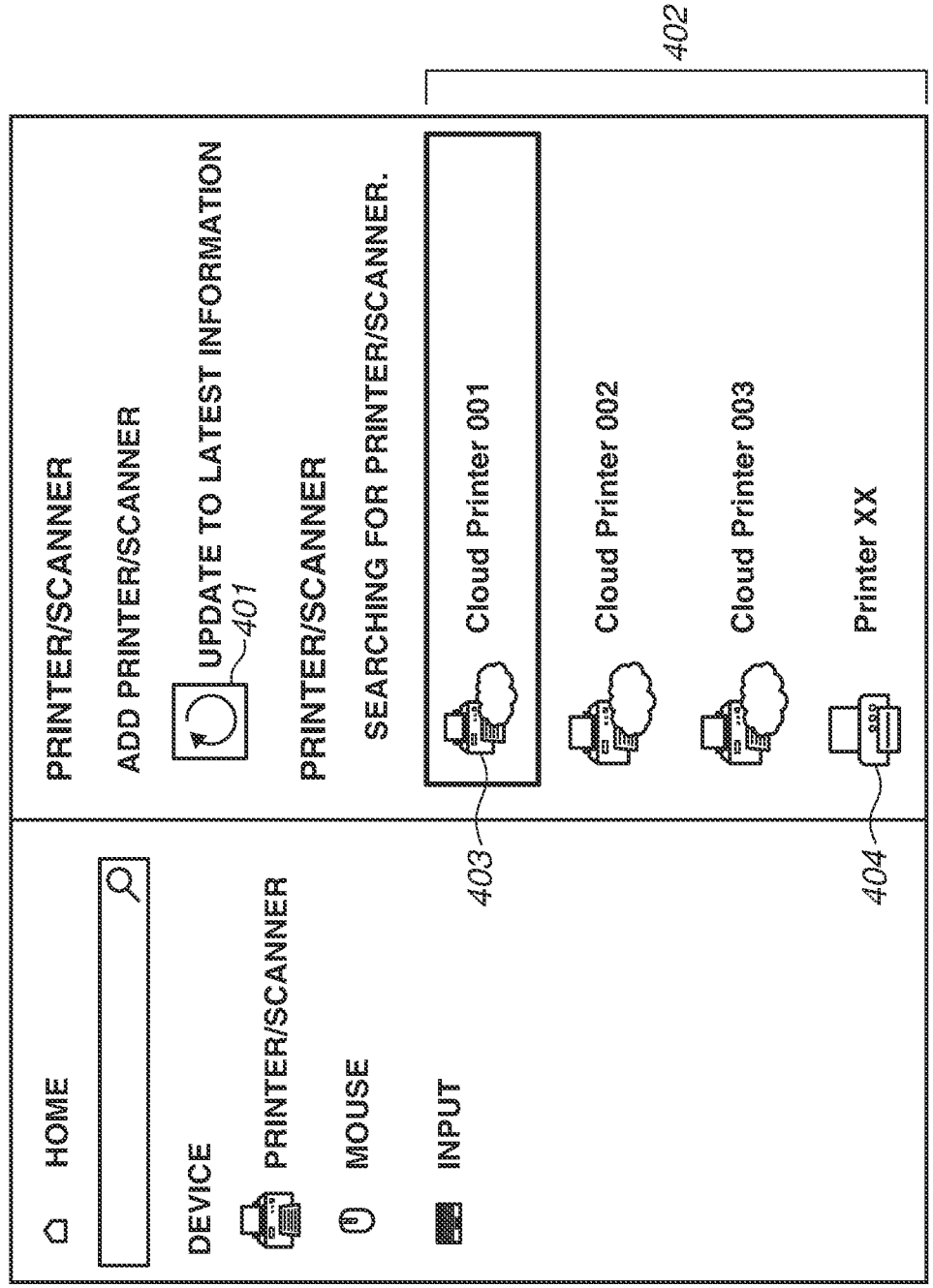
FIG. 4 is a diagram illustrating an example of a screen displayed on a client terminal according to the first embodiment.

In step S3002, the OS 313 of the client terminal 101 receives a printer addition operation that is a setup operation performed by the user to set up the cloud-print ready printer 104. The setup operation for setting up the cloud-print ready printer 104 is, for example, an operation described below. FIG. 4 illustrates a screen that is displayed by the OS 313 of the client terminal 101 and relates to printers registered with the client terminal 101. In a case where the user selects an object 401, a printer search instruction is input to the OS 313.

The OS 313 having received the printer search instruction determines whether a token for the cloud print service 321 is stored. In a case where the OS 313 stores no token, the OS 313 displays a screen (not illustrated) for inputting user information (i.e., login name, password). In step S3003, the OS 313 of the client terminal 101 transmits the user information input via the screen to the cloud print service 321 and requests user authentication and an access token.

In step S3004, the cloud print service 321 performs authentication processing using the user information received from the client terminal 101. After completing the authentication processing, the cloud print service 321 transmits an authentication result notification to the client terminal 101.

In step S3005, in a case where the user authentication is successful, the OS 313 of the client terminal 101 acquires an access token from the cloud print service 321.

In step S3006, in a case where the user authentication in step S3004 fails, the cloud print service 321 transmits an authentication error notification to the OS 313 of the client terminal 101. In step S3007, the OS 313 of the client terminal 101 stops processing based on the received authentication error information. In a case where an access token is not successfully acquired, the OS 313 of the client terminal 101 ends the process in FIGS. 3A and 3B.

In a case where the OS 313 stores an access token or successfully acquires an access token in step S3005, the processing proceeds to step S3008. The OS 313 searches for printers registered with the cloud print service 321 and printers connected to the network 107.

In step S3008, the OS 313 of the client terminal 101 transmits a request to acquire printer information registered with the cloud print service 321 and searches for printers. In step S3008, the OS 313 of the client terminal 101 transmits the printer information acquisition request with the access token attached thereto to the cloud print service 321.

In step S3009, the cloud print service 321 transmits, to the client terminal 101, information about printers that the user identified by the access token attached to the acquisition request is permitted to use. The printer information transmitted to the client terminal 101 in step S3009 is printer names assigned to the printers registered with the cloud print service 321 and HWIDs of the printers.

The OS 313 of the client terminal 101 acquires a list of printers and device identification information about each of the printers that are transmitted from the cloud print service 321. In parallel with steps S3008 and S3009, the OS 313 of the client terminal 101 searches for printers connected to the network 107 to which the client terminal 101 is connected. This is a device search using multicast Domain Name System (mDNS) or Bonjour.

The OS 313 displays the list of printers on the client terminal 101 based on the printer information acquired from the cloud print service 321 and the printer information detected by the search on the network 107. A region 402 in FIG. 4 displays the printer information received from the cloud print service 321 in a list form. The printer information "Cloud Printer 001/002/003" displayed in the region 402 is information about the printers registered with the cloud print service 321. On the other hand, the printer information "Printer XX" is a printer detected through the search on the network 107 by the client terminal 101. In this manner, the printer information acquired from the cloud print service 321 and the printer information detected through the search on the network 107 are displayed in the list form. The printer information received from the cloud print service 321 is displayed with an icon 403 added thereto. On the other hand, the printer information detected through the search on the network 107 is displayed with an icon 404 added thereto. By adding the different icons as described above, the printer information received from the cloud print service 321 and the printer information detected through the search on the network 107 are displayed distinguishably from each other. Alternatively, the client terminal 101 can display only the printer information registered with the cloud print service 321.

Next, the user selects, from the printer information displayed in the region 402, printer information corresponding to a printer that the user wishes to register with the client terminal 101.

In step S3010, the OS 313 of the client terminal 101 transmits, to the cloud print service 321, an inquiry about capability information about the printer corresponding to the selected printer information. About which setting item of the capability information the OS 313 of the client terminal 101 is to inquire is defined by the specifications of the OS 313 and is set in the OS 313. The OS 313 of the client terminal 101 designates a setting item stored in advance and transmits an inquiry about the designated setting item of the capability information. The items set in advance in the OS 313 are the setting items defined as the standard specifications by IPP, and examples of the items include "sheet size", "sheet type", "color mode", and "borderless printing".

In step S3011, the cloud print service 321 responds to the OS 313 of the client terminal 101 with the capability information about the cloud-print ready printer 104.

While the information registered with the cloud print service 321 during the registration in step S3001 is transmitted to the client terminal 101 in step S3011 according to the present embodiment, capability information that is registered with the cloud print service 321 at another timing can be transmitted to the client terminal 101. For example, capability information that is registered with the cloud print service 321 in a case where the capability information about the cloud-print ready printer 104 is changed can be transmitted to the client terminal 101. Further, capability information that is updated in a case where the user issues a capability information update instruction on a user interface provided by the cloud print service 321 can be transmitted to the client terminal 101. Furthermore, the cloud print service 321 can acquire capability information from the cloud-print ready printer 104 at the timing of step S3010 and can notify the client terminal 101 of the acquired capability information.

In step S3011, the cloud print service 321 returns attribute values and default values that correspond to the setting items designated by the client terminal 101. The attribute values to be returned herein are all the attribute values registered with the cloud print service 321 regardless of whether the attribute values are defined as the standard. The default values are values that are initially set at the time of displaying a print setting screen by the client terminal 101. The cloud print service 321 does not respond to the OS 313 in a case where the cloud print service 321 does not store a response to an attribute specified in the inquiry from the OS 313 of the client terminal 101.

Next, the OS 313 starts installing the cloud printer driver 311 based on the device identification information and the printer name of the printer selected by the user.

Then, in step S3012, the OS 313 generates a print queue for the cloud printer driver 311 having basic capability information included in the OS 313. The device capability information is definition information that is needed to generate print setting capability information about a printer driver, e.g., definition information described using an extensible markup language (XML) such as PrintDeviceCapabilites. FIG. 6A is a diagram illustrating an example of an initial state of device capability information included in the OS 313. For example, "Feature" indicates that "PageMediaSize" representing the sheet size is a setting item. Further, "Option" specifies options corresponding to "PageMediaSize". As illustrated in FIG. 6A, initial values of the device capability information include only two options "A4" and "LETTER" for the sheet size. This information is stored in association with a print queue at the time of generating the print queue and is managed by the OS 313. The device capability information in the initial state is fixed device capability information regardless of information about a connected printer.

Thereafter, the OS 313 updates the device capability information for configuring the cloud printer driver 311 using the capability information acquired from the cloud print service 321. FIGS. 6B-1 and 6B-2 are diagram illustrating an example of device capability information updated using capability information acquired from the cloud print service 321. For example, an "Option" other than "A4" and "LETTER" is additionally described in "PageMediaSize" representing the sheet size as a sheet size that the cloud-print ready printer 104 is capable of printing. As described above, the client terminal 101 first registers the cloud printer driver 311 and the device capability information included in the OS 313 in association with each other in the print queue. Thereafter, the device capability information associated with the print queue is updated using the capability information acquired from the cloud print service 321. At this time, the OS 313 updates the device capability information using only the attribute values defined by the industry standard specifications among the attribute values of the capability information acquired from the cloud print service 321. Thus, even in a case where, for example, a vendor-specific attribute value is acquired as a sheet type during the capability information acquisition, the vendor-specific attribute value is not added to the device capability information.

Performing the foregoing operations enables setting of a print setting value that cannot be set based on the device capability information included in the OS 313.

Then, the installation of the cloud printer driver 311 is completed. Performing the foregoing processing enables transmission of print data from the client terminal 101 to the print queue for the cloud-print ready printer 104 that is generated in the cloud print service 321.

Next, the OS 313 starts installing an application for extending the cloud printer driver 311 that is associated with the cloud-print ready printer 104.

First, the OS 313 performs processing to add additional identification information to the device identification information. This is necessary processing in acquiring an extension setup information file from the online support server 105, and the additional identification information can be any character string different from normal device identification information. According to the present embodiment, the OS 313 adds additional identification information ("PrinterApp_") indicating that the application corresponds to a printer to the device identification information in order to distinguish the application from the applications for the other devices. "PrinterApp_" is a mere example, and other character strings, numbers, or symbols can be used. For example, in a case where the device identification information about the cloud-print ready printer 104 is device001, the device identification information after the processing of adding the additional identification information is PrinterApp_device001.

In step S3013, the OS 313 transmits, to the online support service 351, a request to search for an extension setup information file including the target device identification information with the additional information added thereto. In step S3013, "PrinterApp_device001" including the additional identification information is notified to the online support service 351.

The online support service 351 stores extension setup information files as illustrated in FIG. 7. FIG. 7 illustrates an example of the extension setup information file acquired from the online support service 351. An extension setup information file is a file generated by the vendor of the cloud-print ready printer 104 and registered with the online support service 351. According to the present embodiment, the extension setup information file is prepared for each printer model type.

The extension setup information file describes an application identifier for identifying the print setting extension application 312 used for configuring the settings for print data to be transmitted to the cloud-print ready printer 104. The item "PackageFamilyName" of the extension setup information file illustrated in FIG. 7 is the identification information about the print setting extension application 312. Meanwhile, "PrinterHardwareId" describes a character string including the additional identification information in addition to the identification information about the cloud-print ready printer 104.

The online support service 351 stores extension setup information files describing identification information about printer drivers in addition to extension setup information files describing identification information about print setting extension applications. In the extension setup information files, printer driver identifiers are described in "PackageFamilyName". Further, device identification information without additional identification information is described in "PrinterHardwareId" of the extension setup information files.

As described above, the online support service 351 stores both the extension setup information files describing the printer driver identifiers and the extension setup information files describing the print setting extension application identifiers. Thus, the OS 313 adds the additional identification information to the device identification information as appropriate in order to acquire a necessary extension setup information file.

The online support service 351 having received the search request identifies an extension setup information file including the "PackageFamilyName" that matches the device identification information with the additional identification information specified by the request.

As a result of the search, in a case where the online support service 351 stores the extension setup information file including the target device identification information, in step S3014, the online support service 351 returns the extension setup information file to the OS 313. At this time, the content of the extension setup information file is written to a registry of the OS 313.

Next, in step S3015, the OS 313 installs the extension setup information described in the extension setup information file acquired from the online support service 351 in association with the print queue generated in step S3012.

Next, in step S3016, the OS 313 extracts an application identifier (application ID) from the installed extension setup information. The application ID is an identifier defined in the "PackageFamilyName" in the extension setup information file. The foregoing processing is the processing to be performed in a case where the online support service 351 stores the extension setup information file corresponding to the cloud-print ready printer 104.

According to the present embodiment, the application ID described in the extension setup information file corresponding to the inkjet printer 104a and the application ID described in the extension setup information file corresponding to the electrophotographic printer 104b are the same application ID. Specifically, the same print setting extension application 312 is installed at the time of generating a print queue based on the information about the inkjet printer 104*a* and at the time of generating a print queue based on the information about the electrophotographic printer 104*b*.

There may be a case where the extension setup information file including the target device identification information is not detected from the online support service 351 as a result of the search. In this case, in step S3017, the OS 313 completes the cloud printer driver installation and stops the application installation processing. The processing proceeds to step S3017 in a case where an extension setup information file is not received within a predetermined time from the search request in step S3013 or in a case where an error notification is received from the online support service 351.

While an extension setup information file is registered with the online support service 351 for each printer model type according to the present embodiment, a single extension setup information file describing HWIDs of a plurality of printers can be prepared. For example, an extension setup information file describing both of the HWID of the inkjet printer 104*a* and the HWID of the electrophotographic printer 104*b* is registered with the online support service 351. This makes it possible to install the same print setting extension application 312 in generating a print queue for the inkjet printer 104*a* and in generating a print queue for the electrophotographic printer 104*b*.

Step S3018 and subsequent steps in a case where an extension setup information file is successfully acquired and an application ID is successfully extracted in step S3016 will be described below.

In step S3018, the OS 313 transmits, to an application management service 331, a request to search for applications with an application ID that matches the extracted application ID. The application management service 331 stores each application that operates on the client terminal 101 in association with an application ID that is an identifier of the application. The applications and the application IDs are registered with the application management service 331 by the vendor providing the cloud-print ready printer 104.

In a case where the application management service 331 stores a print setting extension application with an application ID that matches the requested application ID, in step S3019, the application management service 331 returns the print setting extension application 312 to the client terminal 101. The print setting extension application 312 returned herein is an application given the same identifier (ID) as the transmitted application ID.

In step S3020, the OS 313 installs the acquired print setting extension application 312 in association with the print queue at the client side. The OS 313 stores the application ID as print queue information in the registry. Further, the print setting extension application 312 sets the OS 313 so that the OS 313 will transmit an event notification at a timing when the print queue associated with the print setting extension application 312 is set on the print setting screen. The installed print setting extension application 312 is activated after the client terminal 101 is turned on and the OS 313 is activated, and after being activated, the print setting extension application 312 operates as a background task.

In a case where the application management service 331 stores no print setting extension applications with an application ID that matches the requested application ID, in step S3021, the OS 313 stops the application installation processing. In this case, the generated print queue and the cloud printer driver 311 are installed in association with each other, and the process is ended without associating the print setting extension application 312 with the print queue.

While a case where the extension setup information file search is performed using the device identification information about the cloud-print ready printer 104 with the predetermined character string added to the device identification information is described above, the search can be performed without adding the predetermined character string in a case where files for printer driver installation are distinguishable.

Next, an example of a procedure for the user and a sequence between the software components and the cloud print service 321 according to the present embodiment will be described below with reference to FIGS. 8A and 8B.

A document generation application 315 is an application such as an application for generating document data, an application for generating presentation materials, and an application for displaying pictures and image data.

The document generation application 315 displays a print setting screen (FIG. 11) for selecting a print queue as an initial print setting screen. While the document generation application 315 displays the initial print setting screen according to the present embodiment, the OS 313 can display a similar screen. An object 1101 for selecting a print queue, objects 1102 for selecting various print settings, and a print preview image 1103 are displayed on the initial print setting screen.

In step S801, the OS 313 selects a print queue associated with a printer set as a default printer.

According to the present embodiment, the cloud-print ready printer 104 is selected as a default printer. The processes in step S801 and subsequent steps are performed also in a case where the user operates the object 1101 and changes the printer to be used.

Next, in step S802, the OS 313 transmits an inquiry about capability information about the cloud-print ready printer 104 to the queue on the cloud that corresponds to the cloud-print ready printer 104 in the cloud print service 321. About which setting item of the capability information the OS 313 is to inquire is predetermined by the specifications of the OS 313. Thus, the capability information to be acquired at this timing is similar to the capability information acquired in step S3011 in FIG. 3B. The inquiry is transmitted to the cloud-print ready printer 104 using, for example, the standard protocol commands defined by IPP, such as Get-printer-Attributes. In a case where Get-printer-Attributes is used, an inquiry is made about the capability information determined by the OS 313 in a list form.

In step S803, the cloud print service 321 returns, to the OS 313, the capability information about the cloud-print ready printer 104 from the capability information list transmitted using the Get-printer-Attributes. For example, in a case where the Get-printer-Attributes (IPP) designates a medium size attribute and the cloud print service 321 stores the medium size attribute, the cloud print service 321 returns a value (e.g., A4, B5, Letter) associated with the attribute. The cloud print service 321 does not return the associated value in a case where the attribute designated by the Get-printer-Attributes is not in the queue for the cloud-print ready printer 104 in the cloud print service 321. The capability information to be acquired in step S803 is capability information about attributes that the OS 313 always inquires regardless of the type and capabilities of the connected printer.

The OS 313 updates the device capability information using the capability information acquired from the cloud print service 321. In step S804, the OS 313 adds the capability information acquired in step S803 in FIG. 8A to the device capability information generated in step S3012 in FIG. 3B. In a case where the device capability information is to be updated, performing step S803 updates the device capability information managed by the client terminal 101. In updating the device capability information in step S804, only the attribute values defined by the industry standard specifications in the device capability information are updated.

Next, in step S805, the OS 313 notifies the print setting extension application 312 of an event and an application programming interface (API) for use in editing the device capability information. The timing to notify the event is registered at the time of installing the print setting extension application 312 in the OS 313 of the client terminal 101.

The print setting extension application 312 having received the event transmits a capability information acquisition request to the cloud print service 321. The capability information acquisition performed herein is the acquisition of capability information in order to write a setting item and an attribute value that are uniquely defined by the printer vendor to the device capability information.

In step S806, the print setting extension application 312 having received the event from the OS 313 transmits an inquiry about capability information about the cloud-print ready printer 104 to the cloud print service 321. At this time, the print setting extension application 312 transmits, to the cloud print service 321, an inquiry about capability information on setting items including a setting item that is uniquely defined by the printer vendor and an attribute value specific to the printer vendor. The inquiry is transmitted using the Get-printer-Attributes as in step S802 in FIG. 8A, and item names of inquiry-target setting items are specified, whereby capability information is acquired. The capability information acquisition can also be performed to acquire a setting item having been acquired through the capability information acquisition by the OS 313. Further, in the capability information acquisition in step S806, the print setting extension application 312 acquires information for determining whether the printer associated with the selected print queue is an inkjet printer or an electrophotographic printer.

In step S807, the cloud print service 321 having received the capability information inquiry from the print setting extension application 312 responds to the print setting extension application 312. A method for the response herein is similar to the method in step S3011 in FIG. 3B described above. According to the present embodiment, in step S807, the cloud print service 321 responds with the capability information about the cloud-print ready printer 104 that is stored in the cloud print service 321. Alternatively, the cloud print service 321 having received the request in step S806 can re-acquire the capability information from the cloud-print ready printer 104 and respond to the client terminal 101 with the re-acquired capability information.

The print setting extension application 312 having acquired the capability information from the cloud-print ready printer 104 edits the device capability information managed by the OS 313 via a configuration information object. The configuration information object is a set of data necessary for editing the device capability information. The print setting extension application 312 cannot directly edit the device capability information stored in the OS 313. Thus, the print setting extension application 312 uses the configuration information object to change the device capability information stored in the OS 313. In step S808, the print setting extension application 312 edits the device capability information by converting the capability information such as "staple-free binding" and "store job in printer" acquired in step S807 in FIG. 8A into device capability information and adding the converted device capability information to the configuration information object. As a result of performing the process up to step S808, in addition to the capability information about the standard setting items acquired through the inquiry to the OS 313, the setting items and the attribute values that are uniquely defined by the printer vendor are stored in the device capability information. Further, as a result of performing step S808, information indicating that the printer associated with the print queue is an inkjet printer or an electrophotographic printer is stored in the device capability information.

Next, in step S809, the print setting extension application 312 passes the edited device capability information to the OS 313. The OS 313 stores the device capability information acquired from the print setting extension application 312 in association with the print queue.

In a case where the OS 313 updates the device capability information, in step S810, an object that is a trigger to display the UI of the print setting extension application 312 is enabled. The object that is a trigger to display the UI of the print setting extension application 312 is, for example, an object 1104 in FIG. 11. Until the processing of step S810 is completed, the object 1104 is grayed out, and even in a case where the user clicks the object 1104, the print setting screen of the print setting extension application 312 is not displayed. After the processing of step S810 is completed, the object 1104 is no longer grayed out, and the object 1104 becomes selectable by the user.

In step S811, in a case where the user selects the object 1104, the print setting extension application 312 is activated and displays a print setting screen as illustrated in FIGS. 10A to 10D. The print setting screen does not depend on a type of the document generation application 315 to be used.

In a case where the print setting extension application 312 is not associated with the selected print queue, a standard print setting screen provided by the OS 313 is displayed as illustrated in FIG. 9A. At the press of an advanced settings button 901 on the standard print screen, an advanced print screen in FIG. 9B for configuring setting items that cannot be displayed in FIG. 9A is displayed. The advanced print screen illustrated in FIG. 9B can be scrolled by operating a scroll bar, and as illustrated in FIGS. 9C and 9D, a plurality of setting items of the print settings that is supported by the OS 313 can be set. In a case where an OK button 902 is selected, the set print settings are stored, and the screen returns to the standard print setting screen in FIG. 9A. In FIG. 9A, an apply button 903 is a button for storing the print settings, and a cancel button 904 is a button for returning to the screen in FIG. 11 without storing the print settings. In a case where an OK button 905 is selected, the print settings are stored, and the screen returns to the screen in FIG. 11. The print setting items and the attribute values that are uniquely defined by the printer vendor cannot be set in the screens in FIGS. 9A to 9D.

In a case where the device capability information stores "borderless printing" and "ON/OFF" as an attribute value of "borderless printing", a borderless printing setting 906 in FIG. 9C is displayed. In a case where the print queue is associated with no print setting extension application, the setting item "borderless printing" is displayed regardless of whether the printer associated with the print queue is an inkjet printer or an electrophotographic printer.

Returning to the description of the print setting extension application 312, the print setting extension application 312 receives print setting information generated based on the print setting capability information generated from the device capability information by the OS 313 and displays an extension print setting screen illustrated in FIG. 10A. As illustrated in FIGS. 10A to 10C, the extension print setting screen can be scrolled by operating a scroll bar, and as the extension print setting screen is scrolled, various setting items are displayed.

For example, an output sheet size of a setting item 1001 in FIG. 10A is print setting information generated from psk:PageMediaSize in FIGS. 6B-1 and 6B-2. Further, A4 that is an option of the output sheet size is generated based on print setting information psk:IOSA4 by the print setting extension application 312 and is displayed. As described above, the print setting extension application 312 converts the device capability information into the setting values and displays the extension print setting screen. Since the extension print setting screen is generated from the device capability information including the capability information about the setting items specific to the printer vendor, setting items and setting values that cannot be set on the screen in FIG. 9 provided by the OS 313 can be set on the extension print setting screen.

The extension print setting screen in FIG. 10C is displayed in a case where the device capability information stores information indicating that the printer is an inkjet printer and the capability information about borderless printing. In a case where the printer associated with the print queue is the inkjet printer 104a, the print setting extension application 312 displays an object 1003 for enabling or disabling "borderless printing" based on the capability information about "borderless printing". On the other hand, the extension print setting screen in FIG. 10D is displayed by the print setting extension application 312 in a case where the device capability information stores information indicating that the printer is an electrophotographic printer and the capability information about borderless printing. In FIG. 10D, the capability information about borderless printing is converted into an object 1004 for enabling or disabling the function "expand print region and print", and the object 1004 is displayed. The screen in FIG. 10D is displayed in place of the screen in FIG. 10C. As described above, the print setting extension application 312 displays the single function "borderless printing" of the device capability information by different function names depending on whether the printer associated with the print queue is an inkjet printer or an electrophotographic printer for the following reason.

Figure 14A:
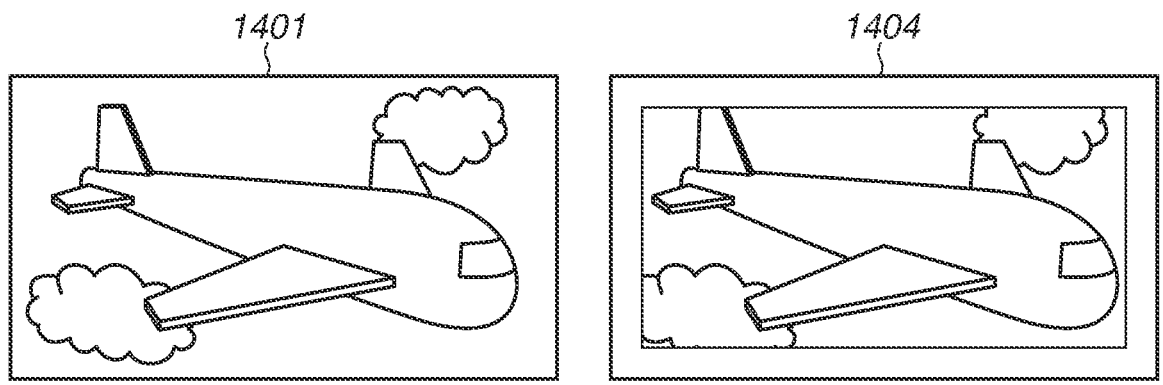
FIGS. 14A and 14B are diagrams each illustrating an example of a printing result according to the first embodiment.

The inkjet printer 104a is capable of printing an image up to edges of a sheet 1401 as illustrated in FIG. 14A. FIG. 14A indicates that an image of the same size as the sheet 1401 is printed on the sheet 1401. Thus, as the name indicates, the image is printed without a border formed by a margin. In a case where "borderless printing" is disabled, a print region is an inside region with a predetermined margin portion from each edge of a sheet 1404.

Figure 14B:
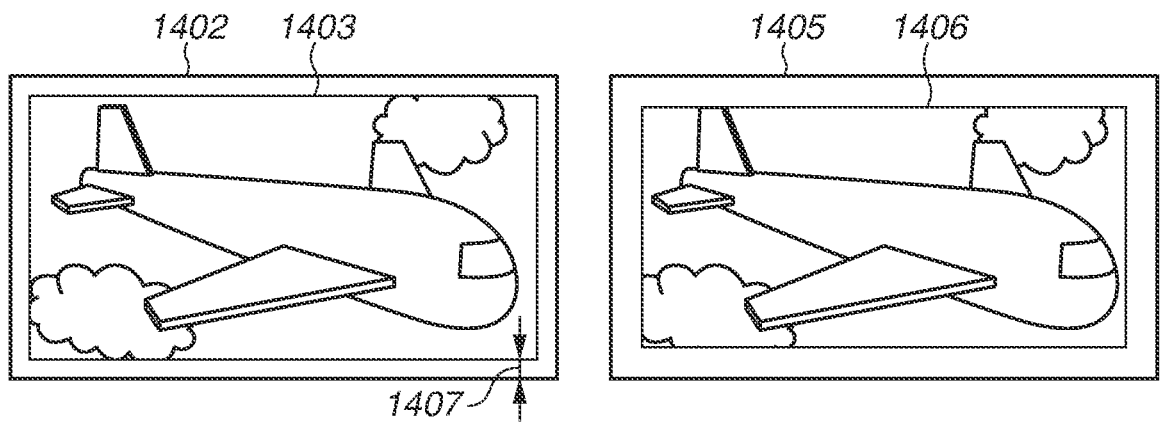

On the contrary, in a case where the electrophotographic printer 104b is used, a margin portion to which no toner is to be applied is provided at the edges of a sheet. This is because, if toner is applied to the edges of a sheet, it may make it difficult to remove the sheet from the conveyor belt. Thus, unlike the output of the inkjet printer 104a without a margin portion, a margin is provided around a print region 1403 as illustrated in FIG. 14B. FIG. 14B illustrates examples of materials output by the electrophotographic printer 104b. The print region 1403 is set as a printable region in a sheet 1402. In a case where "expand print region and print" is disabled, a print region 1406 is set as a printable region in a sheet 1405. The print region 1406 is smaller than the print region 1403.

If the setting item is displayed by the setting item name "borderless printing" on the print setting screen on the electrophotographic printer 104b, it may cause the user to misunderstand that an output without a border will be obtained as in a case of the inkjet printer 104a. Thus, the setting item is displayed on the extension print setting screen for the electrophotographic printer 104b with the setting item name changed to "expand print region and print" so as to make it easy for the user to envision the output material to be obtained.

Figure 11:
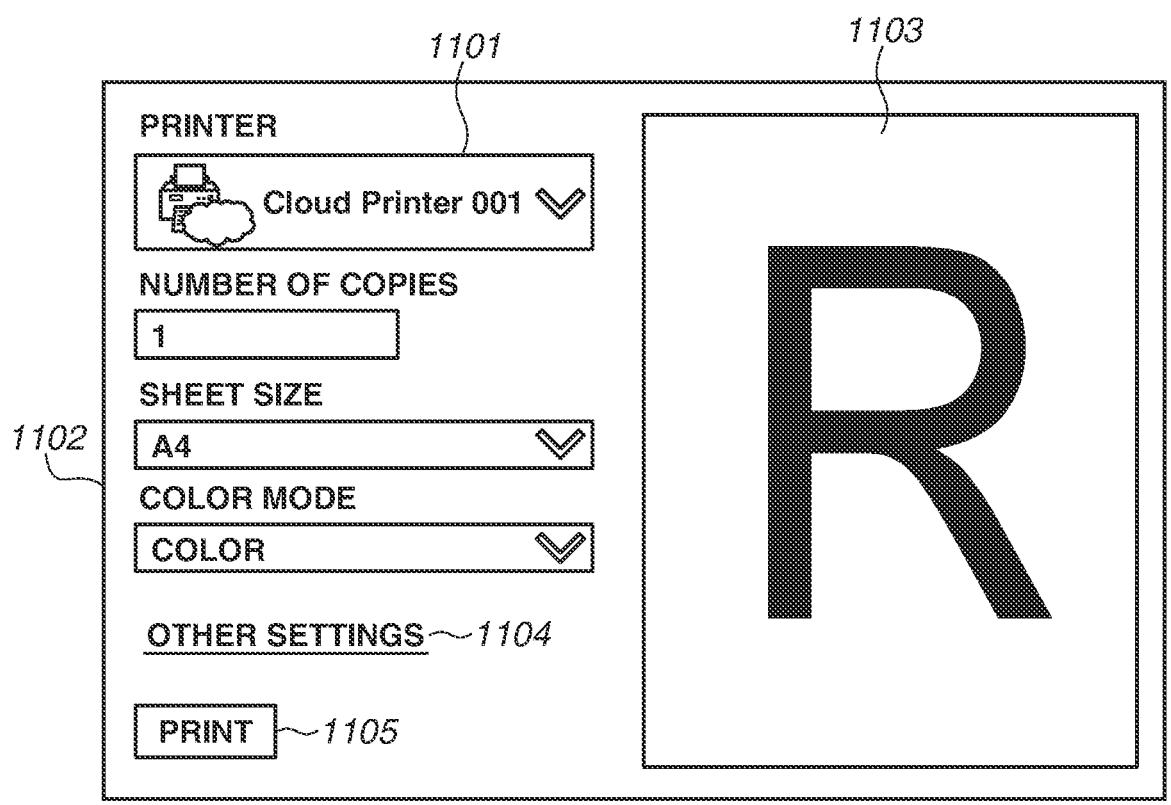
FIG. 11 is a diagram illustrating an example of a print setting screen displayed by a document generation application according to the first embodiment.

The user selects an object 1002 on the screen in FIGS. 10A to 10D displayed by the print setting extension application 312. The object 1002 is an object for finalizing the print settings. The print setting extension application 312 provides a function that enables the user to change the print settings freely, and in a case where the print settings are changed, the print setting extension application 312 stores the setting values of the changed print settings. For example, in a case where the user changes the medium size from A4 to Letter on the UI, the print setting information stored in the print setting extension application 312 is changed from A4 to Letter. In a case where the object 1002 is selected, the print setting extension application 312 acquires the print setting information processed within the controls of the print setting screen from the print setting screen and provides the print setting information to the OS 313. In step S812, after the print setting extension application 312 provides the print setting information to the OS 313, the display of the print setting screen in FIGS. 10A to 10D is ended. After the processing of step S812 is completed, the print setting screen illustrated in FIG. 11 is displayed. The print setting screen displayed at this time is a screen with the setting values set by the print setting extension application 312.

In a case where the user selects an object 1105 on the print setting screen illustrated in FIG. 11, a print instruction is input to the OS 313. In step S813, the OS 313 performs printing processing based on the instruction input via the document generation application 315.

In step S814, in a case where an instruction to perform printing is issued, the OS 313 generates intermediate data and passes the generated intermediate data and the print setting information edited via the print setting screen to the print setting extension application 312. The intermediate data is data generated before the conversion into print data, such as page description language (PDL) data, and an example of intermediate data is extensible markup language paper specification (XPS) data. The print setting information can be included in the intermediate data.

In step S815, the print setting extension application 312 having received the intermediate data and the print setting information from the OS 313 generates print data based on the intermediate data and generates printing capability information based on the print setting information. The print data is, for example, print data in portable document format (PDF) file format or Printer Working Group (PWG) Raster (PWG-Raster) format, and the printing capability information is specifically information describing the print setting information using attribute values defined by IPP.

In step S816, after generating the print data, the print setting extension application 312 passes the generated print data and the generated printing capability information to the print queue of the OS 313.

Steps S814 to S816 are the processing in a case where the print setting extension application 312 associated with the print queue is installed in the client terminal 101. In a case where the print setting extension application 312 is not installed in the client terminal 101, the client terminal 101 performs step S817 after step S813 without performing steps S814 to S816. In step S817, the OS 313 generates XPS data, edits the page layout, converts the XPS data into a predetermined format such as PDF or PWG-Raster, and generates print data and printing capability information.

In step S818, the OS 313 transmits, to the cloud print service 321 via the print queue, the print data and the printing capability information that are received from the print setting extension application 312 or the print data and the printing capability information that are generated by the OS 313.

In step S819, the cloud print service 321 transmits, to the cloud-print ready printer 104, the print data and the printing capability information that are received from the client terminal 101. While the cloud print service 321 having receive print data and printing capability information transmits the received print data and the received capability information to the cloud-print ready printer 104 according to the present embodiment, the cloud-print ready printer 104 can periodically transmit an inquiry to the cloud print service 321 to acquire unprinted print data and printing capability information corresponding to the unprinted print data.

By performing the foregoing processing, print data in which the print settings set using the print setting extension application 312 are reflected can be transmitted to the cloud-print ready printer 104 via the cloud print service 321.

FIG. 12 is a flowchart illustrating a process up to the print setting extension application installation in the client terminal 101 by the OS 313. A program for proceeding to the process illustrated in the flowchart is stored in the storage unit 214 of the client terminal 101. The process is implemented by the CPU 212 by executing the program.

In step S1201, the CPU 212 displays the screen illustrated in FIG. 4 and receives a printer search instruction. In a case where the user selects the object 401 in FIG. 4, the CPU 212 receives a printer search instruction.

In step S1202, the CPU 212 determines whether an access token corresponding to the cloud print service 321 is stored. For each user logging in to the client terminal 101, the client terminal 101 stores an access token for acquiring information from the cloud print service 321. The CPU 212 determines whether an access token associated with the user having logged in to the client terminal 101 is stored. In a case where the access token is stored (YES in step S1202), the processing proceeds to step S1206 described below.

In a case where the access token is not stored (NO in step S1202), then in step S1203, the CPU 212 transmits an authentication request to the cloud print service 321. Then, the CPU 212 receives a URL that is used to display a screen for inputting necessary information for the authentication from the cloud print service 321.

In step S1204, the CPU 212 accesses the received URL and displays the screen for inputting the information that is used for the authentication. The information for use in the authentication is, for example, a user ID and a password.

In step S1205, the CPU 212 transmits the input information that is used for the authentication to the cloud print service 321 and acquires an access token. In a case where the authentication to the cloud print service 321 fails, the CPU 212 cannot acquire an access token, and the process illustrated in FIG. 12 is ended.

In step S1206, the CPU 212 transmits, to the cloud print service 321 using the access token, a request to acquire printer information registered in the cloud print service 321. The cloud print service 321 selects information about a printer that can be used by the user identified by the received access token, and transmits the selected printer information to the client terminal 101. The printer names registered in association with the printers that can be used by the user identified by the access token received from the client terminal 101 and the HWIDs of the printers are transmitted to the client terminal 101 herein.

In step S1207, the CPU 212 displays the printer information acquired from the cloud print service 321 on the display unit 216 of the client terminal 101. By performing the displaying process in step S1207, the printer information is displayed in the region 402 in FIG. 4 in a list form.

In step S1208, the CPU 212 determines whether printer information is selected. The CPU 212 repeats step S1208 until printer information is selected. In a case where printer information is selected (YES in step S1208), the processing proceeds to step S1209.

In step S1209, the CPU 212 transmits a request to acquire capability information about the selected printer to the cloud print service 321. An inquiry about the setting items registered in advance with the OS 313 is transmitted to the cloud print service 321 herein.

In step S1210, the CPU 212 updates the printer capability information stored in the client terminal 101 based on the information acquired from the cloud print service 321 and generates a print queue.

In step S1211, the CPU 212 transmits an extension setup information file acquisition request to the online support service 351. The acquisition request includes the HWID of the printer.

In step S1212, the CPU 212 determines whether an extension setup information file is successfully acquired. In a case where an extension setup information file is successfully acquired (YES in step S1212), the processing proceeds to step S1213. On the other hand, in a case where the extension setup information file acquisition fails (NO in step S1212), the process in FIG. 12 is ended.

In step S1213, the CPU 212 transmits a request to acquire a print setting extension application described in the acquired extension setup information file to the application management service 331. The CPU 212 acquires an application ID of the print setting extension application from the extension setup information file and transmits a request to acquire the print setting extension application with designation of the acquired application ID to the application management service 331.

In step S1214, the CPU 212 determines whether the print setting extension application is successfully acquired. In a case where the print setting extension application acquisition fails (NO in step S1214), the process in FIG. 12 is ended. In a case where the print setting extension application is successfully acquired (YES in step S1214), the processing proceeds to step S1215.

In step S1215, the CPU 212 installs the acquired print setting extension application and registers the application ID of the print setting extension application in association with the print queue. Furthermore, the CPU 212 registers an event indicating a notification timing with the OS 313. The even herein is registered so that the event will be notified to the print setting extension application in a case where the print queue associated with the print setting extension application is selected on a print setting screen displayed by a document application.

The process up to the registration of the print setting extension application in the client terminal 101 has been described above.

Figure 13A:
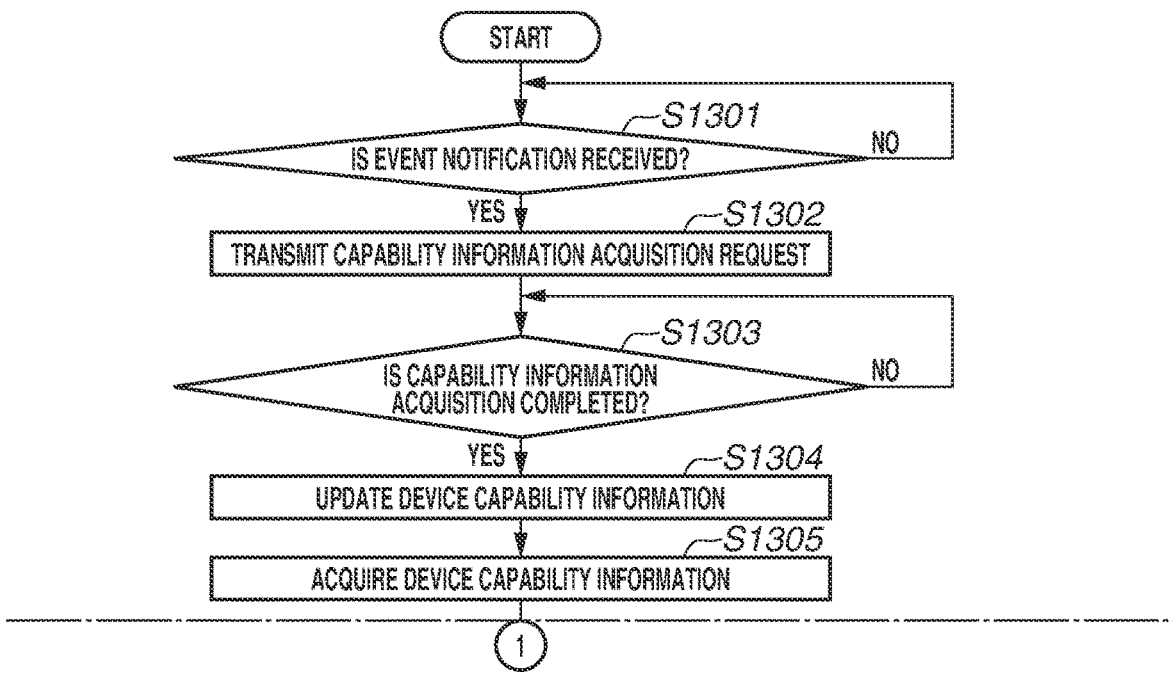

Next, a process of changing wording displayed on the print setting screen based on the model type, configuring the print settings selected by the user, and generating print data by the installed print setting extension application 312 will be described below with reference to FIGS. 13A and 13B. A program for executing the process in FIGS. 13A and 13B is stored in the print setting extension application 312, and the program is loaded to the memory 213 of the client terminal 101 and executed by the CPU 212.

In step S1301, the CPU 212 determines whether an event notification is received. The event notification is a notification issued by the OS 313 and notifies the print setting extension application 312 that it is the timing registered in step S1215 in FIG. 12. The CPU 212 repeats step S1301 while an event notification is not received (NO in step S1301). In a case where an event notification is received (YES in step S1301), the processing proceeds to step S1302.

In step S1302, the CPU 212 transmits, to the cloud print service 321, a request to acquire the capability information about the printer corresponding to the selected print queue. The CPU 212 transmits, to the cloud print service 321, a request to acquire capability information about the setting items set for the print setting extension application 312. At this time, capability information about setting items that are not acquired in step S1206 in FIG. 12 is also acquired.

In step S1303, the CPU 212 determines whether the capability information acquisition is completed. In a case where the capability information acquisition is not completed (NO in step S1303), the CPU 212 repeats step S1303. In a case where the capability information acquisition is completed (YES in step S1303), the processing proceeds to step S1304.

In step S1304, the CPU 212 updates the device capability information using the acquired capability information. By performing step S1304, the capability information about the setting items that are not acquired by the OS 313 is also stored in the client terminal 101. During this processing, information indicating whether the printer associated with the selected print queue is an inkjet printer or an electrophotographic printer is acquired.

In step S1305, the CPU 212 acquires the device capability information from an area where the updated device capability information is stored.

In step S1306, the CPU 212 determines whether an instruction to display the print setting screen of the print setting extension application 312 is received. The instruction to display the print setting screen of the print setting extension application 312 is, for example, an instruction issued based on a user operation of selecting the object 1104 in FIG. 11. In a case where an instruction to display the print setting screen is not received (NO in step S1306), the processing proceeds to step S1314. In a case where an instruction to display the print setting screen is received (YES in step S1306), the processing proceeds to step S1307.

Next, steps S1307 to S1310 of referring to a predetermined attribute and changing the display on the print setting screen based on whether the connected printer is an inkjet printer or an electrophotographic printer will be described below.

In step S1307, the CPU 212 determines whether the device capability information corresponding to the selected printer information includes an attribute to be displayed differently for an inkjet printer and an electrophotographic printer. According to the present embodiment, psk:PageBorderless in the device capability information in FIG. 6A is an attribute to be displayed differently for an inkjet printer and an electrophotographic printer. The character string "Page-Borderless" corresponds to "borderless printing" in FIG. 5.

According to the present embodiment, psk:PageBorderless is displayed as "borderless printing" in a state where an inkjet printer is selected, whereas psk:PageBorderless is displayed as "expand print region and print" in a state where an electrophotographic printer is selected.

As described above, the functions cause different outputs depending on the type of a printer that has received a job. First, the application refers to the value of psk:PageBorderless. In a case where psk:PageBorderless is on, an image is directly used as job data, whereas in a case where psk:PageBorderless is off, job data is generated with margins from edges. Thereafter, the print setting extension application 312 transmits a job to a printer. In a case where the printer having received the job is an inkjet printer, printing is performed without borders. In a case where the printer having received the job is an electrophotographic printer, printing is performed based on limit values of the print region.

Thus, an inkjet printer uses the function as "borderless printing", whereas an electrophotographic printer uses the function as "expand print region and print".

As illustrated in FIG. 14A, "borderless printing" is used as a function for a case where an image is to be transferred to an entire region of a sheet, e.g., a picture. On the other hand, "expand print region and print" is used as a function for a case where a print region is to be reserved as illustrated in FIG. 14B although there is no print guarantee. Since the purposes of use are different, the function in FIG. 14B, which is an example of "expand print region and print", and the function in FIG. 14A, which is an example of "borderless printing", are used as different functions.

Returning to the description of the flowchart in FIGS. 13A and 13B, in a case where the CPU 212 determines that the device capability information acquired in step S1305 includes psk:PageBorderless (YES in step S1307), the processing proceeds to step S1308. On the other hand, in a case where the CPU 212 determines that the device capability information acquired in step S1305 does not include psk:PageBorderless (NO in step S1307), the processing proceeds to step S1311.

In step S1308, the CPU 212 determines whether the printer selected via the object 1101 in FIG. 11 is an inkjet printer. The CPU 212 refers to the device capability information about the printer selected via the object 1101 in FIG. 11 and determines whether an attribute indicating that the printer is an inkjet printer is stored.

In a case where the CPU 212 determines that the selected printer is an inkjet printer (YES in step S1308), the CPU 212 performs step S1310. On the other hand, in a case where the CPU 212 determines that the selected printer is not an inkjet printer (NO in step S1308), the CPU 212 performs step S1309. While whether the selected printer is an inkjet printer is determined in step S1308 according to the present embodiment, whether the selected printer is an electrophotographic printer can be determined.

In identifying an inkjet printer or an electrophotographic printer, setting items and attribute values from which the type of the cloud-print ready printer 104 is identifiable, such as Marker-types and Printer-supply, are used. For example, in a case where the capability information does not include an item of Printer-supply and Ink-Cartridge is acquired from an item of Marker-types, the CPU 212 determines that the selected printer is an inkjet printer. On the other hand, in a case where the capability information does not include an item of Ink-Cartridge and Toner is acquired as a value from an item of Printer-supply, the CPU 212 determines that the selected printer is an electrophotographic printer.

In step S1310, the CPU 212 acquires "borderless printing" as a character string to be the name of the setting item corresponding to psk:PageBorderless included in the device capability information and generates screen information about the extension print setting screen illustrated in FIG. 10C.

On the other hand, in a case where the selected printer is an electrophotographic printer (NO in step S1308), in step S1309, the CPU 212 acquires "expand print region and print" as a character string to be the name of the setting item corresponding to psk:PageBorderless included in the device capability information. The CPU 212 generates screen information about the extension print setting screen illustrated in FIG. 10D.

In step S1311, the CPU 212 displays an extension print setting screen based on the screen information about the extension print setting screen generated in step S1309 or S1310. Then, the CPU 212 receives user operations of selecting setting values via the displayed extension print setting screen.

In step S1312, the CPU 212 determines whether an instruction to end the display of the print setting screen of the print setting extension application 312 is issued. In step S1312, the CPU 212 determines whether the object 1002 in FIGS. 10A to 10D is selected.

In a case where an instruction to end the display of the extension print setting screen is not issued (NO in step S1312), the CPU 212 repeats step S1312. In a case where an instruction to end the display of the print setting screen is issued (YES in step S1312), the processing proceeds to step S1313.

In step S1313, the CPU 212 edits the print setting information using the setting values selected on the extension print setting screen displayed by the print setting extension application 312. The print setting information stores the setting values of the attribute information defined by IPP. Thus, the print setting information describes that psk:PageBorderless is enabled regardless of whether the display on the extension print setting screen is "borderless printing" or "expand print region and print". Then, the CPU 212 ends the display of the print setting screen of the print setting extension application 312.

In step S1314, the CPU 212 determines whether intermediate data from the OS 313 is received by the print setting extension application 312. In a case where the user selects the object 1105 on the print setting screen in FIG. 11, intermediate data is transmitted from the OS 313 to the print setting extension application 312. The CPU 212 determines whether intermediate data is received by the print setting extension application 312.

In a case where intermediate data is not received (NO in step S1314), the processing returns to step S1306. On the other hand, in a case where intermediate data is received (YES in step S1314), the processing proceeds to step S1315.

In step S1315, the CPU 212 generates print data based on the intermediate data received from the print setting extension application 312 and printing capability information. The CPU 212 generates image data in a predetermined format based on the intermediate data and the print setting information. As to the predetermined format, for example, PDF image data is generated for an electrophotographic printer, and PWG-Raster image data is generated for an inkjet printer. Further, the CPU 212 generates printing capability information described using the attribute values defined by IPP, based on the print setting information. The printing capability information indicates the number of copies to be printed and layout information such as N-in-1. Setting items and attribute values can be freely described in the printing capability information in addition to the attribute values defined by IPP. Thus, setting items and attribute values that are uniquely defined by the printer vendor can also be described in the printing capability information.

In step S1316, the CPU 212 determines whether the attribute of PageBorderless is enabled in the print setting information. In a case where the attribute of PageBorderless is enabled in the print setting information (YES in step S1316), the CPU 212 performs step S1317. On the other hand, in a case where the attribute of PageBorderless is disabled in the print setting information (NO in step S1316), the CPU 212 performs step S1318.

In step S1317, the CPU 212 sets top, bottom, right, and left margins at 0 in the printing capability information. The margins are an attribute that is defined by IPP and indicate settings about margins around an image in printing print data to be transmitted. For example, the attribute specifies a length 1407 in FIG. 14B. Regardless of which one of "borderless printing" and "expand print region and print" is displayed on the print setting screen, the same attribute of margins is set at 0 in the printing capability information.

On the other hand, in a case where PageBorderless is disabled, the CPU 212 sets the margins at 500 in the printing capability information. A margin of 500 indicates that image data to be transmitted will not be printed in each 50-mm region from top, bottom, right, and left sides of a sheet. While the margins are set at 500 according to the present embodiment, any number greater than zero can be set. Further, the top, bottom, right, and left margins can be set by the user or the application.

In step S1319, the CPU 212 provides the image data in the predetermined format that is the generated print data and the printing capability information to the OS 313. The OS 313 transmits the print data received via the print queue to the cloud print service 321.

The flowchart illustrating the process for configuring the print settings using the print setting extension application 312 and generating print data and printing capability information has been described above.

The inkjet printer 104a having received the print data with the margins set at 0 in step S1317 prints an image up to the edges of a sheet and, thus, outputs a printed material without a margin region around the image as in the sheet 1401 illustrated in FIG. 14A.

On the contrary, in a case where the electrophotographic printer 104b applies toner to the edges of a sheet, it becomes difficult to remove the sheet from the conveyor belt. Thus, the margins are provided around the image to facilitate the removal of the sheet from the conveyor belt. Even in a case where the margins are set at 0 in the printing capability information, the electrophotographic printer 104b adds margins to set a region where printing is not performed around the image as illustrated in FIG. 14B. The margins to be added by the electrophotographic printer 104b at this time are smaller in value than the margins added in step S1318. This makes it possible to print in a large region compared to a case where "expand print region and print" is disabled.

By performing the foregoing processing, the setting values of the setting items specific to the printer vendor can be set in a case where a print queue associated with a general-purpose cloud printer driver or a local printer driver is selected and print data is to be transmitted.

According to the first embodiment, print data is transmitted to the inkjet printer 104a or the electrophotographic printer 104b via the cloud print service 321. The client terminal 101 can register the local printer driver 314 installed in the client terminal 101 and the inkjet printer 104a in association with each other. This makes it possible to transmit print data from the client terminal 101 to the inkjet printer 104a without using the cloud print service 321.

A case where print data is transmitted to the electrophotographic printer 104b via the cloud print service 321 whereas print data is transmitted to the inkjet printer 104a without using the cloud print service 321 according to a second embodiment will be described below.

A case where the electrophotographic printer 104b and the inkjet printer 104a use the single print setting extension application 312 according to the second embodiment will be described below as an example. According to the second embodiment, the inkjet printer 104a and the electrophotographic printer 104b will be referred to as "printer 104" in a case where the inkjet printer 104a and the electrophotographic printer 104b are not to be distinguished from each other.

First, a method for registering a printer without using the cloud print service 321 will be described below.

In order to connect the client terminal 101 and the inkjet printer 104a together directly, the client terminal 101 and the inkjet printer 104a are to join the same network or are to be connected together directly via a universal serial bus (USB) cable or a local area network (LAN) cable.

In a state where the client terminal 101 and the inkjet printer 104a are connected to the same network, the client terminal 101 is caused to display the screen illustrated in FIG. 4. In a case where the object 401 is selected, a search for printers to which the client terminal 101 can connect is performed. The inkjet printer 104a responds to the search. In a case where the user selects the inkjet printer 104a displayed as a search result, information about the inkjet printer 104a and information about the local printer driver 314 are associated with each other. At this time, a print setting extension application identified based on the HWID or CID of the inkjet printer 104a is stored in the client terminal 101 in association with the information about the inkjet printer 104a. According to the second embodiment, the inkjet printer 104a and the electrophotographic printer 104b use a single print setting extension application.

Next, a case where the electrophotographic printer 104b and the inkjet printer 104a use the same print setting extension application 312 but the electrophotographic printer 104b transmits a job and performs printing via the cloud whereas the inkjet printer 104a transmits a job and performs printing directly via the network according to an embodiment will be described below with reference to FIGS. 15A and 15B and 16A and 16B.

Since a case where printing is performed using the cloud is described above in the first embodiment with reference to FIGS. 8A and 8B, redundant descriptions thereof are omitted. A system in which a job is transmitted directly to the printer 104 will be described below with reference to FIGS. 15A and 15B.

The document generation application 315 is an application such as an application for generating document data, an application for generating presentation materials, and an application for displaying pictures and image data.

The document generation application 315 displays the print setting screen (FIG. 11) for selecting a print queue as an initial print setting screen. While the document generation application 315 displays the initial print setting screen according to the present embodiment, the OS 313 can display a similar screen. The object 1101 for selecting a print queue, the objects 1102 for configuring various print settings, and the print preview image 1103 are displayed on the initial print setting screen.

In step S1501, the OS 313 selects a print queue associated with a printer set as a default printer. According to the present embodiment, the cloud-print ready printer 104, which is not connected via the cloud, is selected as a default printer. The processes in step S801 and subsequent steps are performed also in a case where the user operates the object 1101 and changes the printer to be used.

Next, in step S1502, the OS 313 transmits a capability information inquiry to the inkjet printer 104a. About which setting item of the capability information the OS 313 is to inquire is predetermined by the specifications of the OS 313. Thus, the capability information to be acquired at this timing is similar to the capability information acquired in step S3001 in FIG. 3A. The inquiry is transmitted to the cloud-print ready printer 104 using, for example, the standard protocol commands defined by IPP, such as Get-printer-Attributes. In a case where a Get-printer-Attributes is used, an inquiry is made about the capability information determined by the OS 313 in a list form.

In step S1503, the inkjet printer 104a returns, to the OS 313, the capability information corresponding to the capability information list transmitted using the Get-printer-Attributes. For example, a medium size attribute is designated using a Get-printer-Attributes (IPP). In a case where a medium size attribute is stored, the inkjet printer 104a returns a value (e.g., A4, B5, Letter) associated with the attribute. The cloud-print ready printer 104 does not return the associated value in a case where the attribute designated by the Get-printer-Attributes is not in the queue for the cloud-print ready printer 104. The capability information to be acquired in step S1503 is capability information that the OS 313 always inquires regardless of the type and capabilities of the connected printer.

In step S1504, the OS 313 updates the device capability information using the capability information acquired from the inkjet printer 104a. The OS 313 adds the capability information acquired in step S1503 in FIG. 15A to the device capability information generated in step S3012 in FIG. 3B. In a case where there is an update to the device capability information, the device capability information managed by the client terminal 101 can be updated by performing step S1503. The device capability information updating in step S1504 updates only the attribute values defined by the industry standard specifications in the device capability information.

Next, in step S1505, the OS 313 notifies the print setting extension application 312 of an event and an API for use in editing the device capability information. The timing to notify the event is registered at the time of installing the print setting extension application 312 in the OS 313 of the client terminal 101.

The print setting extension application 312 having received the event transmits a capability information acquisition request to the cloud-print ready printer 104. The capability information acquisition performed herein is the acquisition of capability information in order to write a setting item and an attribute value that are uniquely defined by the printer vendor to the device capability information.

In step S1506, the print setting extension application 312 having received the event from the OS 313 transmits an inquiry about capability information about the inkjet printer 104a. At this time, the print setting extension application 312 transmits, to the inkjet printer 104a, an inquiry about capability information on setting items including a setting item that is uniquely defined by the printer vendor and an attribute value specific to the printer vendor. The inquiry is transmitted using the Get-printer-Attributes as in step S1502 in FIG. 15A, and item names of inquiry-target setting items are specified, whereby capability information is acquired. While the capability information acquisition is performed to acquire capability information on setting items including a setting item and an attribute value that are uniquely defined by the printer vendor in step S1506 in the present embodiment, the capability information acquisition can also be performed to acquire a setting item having been acquired through the capability information acquisition by the OS 313.

In step S1507, the inkjet printer 104a having received the inquiry about the unique capability information from the print setting extension application 312 responds to the print setting extension application 312. A method for the response herein is similar to the method in step S1503 in FIG. 15A described above. According to the present embodiment, in step S1507, the inkjet printer 104a responds with the capability information stored in the inkjet printer 104a.

Subsequent steps S1508 to S1517 are similar in processing to steps S808 to S817 in FIGS. 8A and 8B, so that redundant descriptions thereof are omitted.

In step S1518, the OS 313 transmits, to the inkjet printer 104a via the print queue, the print data and the printing capability information that are received from the print setting extension application 312 or the print data and the printing capability information that are generated by the OS 313.

Next, a process of changing wording displayed on the print setting screen depending on the driver associated with the installed print setting extension application 312 and thereafter configuring the print settings selected by the user and generating print data will be described below with reference to FIGS. 16A and 16B.

A program for executing the process in FIGS. 16A and 16B is stored in the print setting extension application 312, and the program is loaded to the memory 213 of the client terminal 101 and executed by the CPU 212.

In step S1601, the CPU 212 determines whether an event notification is received. The event is an event that is issued by the OS 313 and notifies the print setting extension application 312 that it is the timing registered in step S1215 in FIG. 12. In a case where an event notification is not received (NO in step S1601), the CPU 212 repeats step S1601. On the other hand, in a case where an event notification is received (YES in step S1601), the processing proceeds to step S1602.

In step S1602, the CPU 212 determines whether the printer driver associated with the printer information selected via the object 1101 in the FIG. 11 is the cloud printer driver 311. In the determination, driver information stored in a registry of the storage unit 214 in FIG. 2A is used to determine whether the registered driver is the cloud printer driver 311 or the local printer driver 314.

In a case where the driver associated with the printer information is the cloud printer driver 311 as a result of the determination (YES in step S1602), in step S1603, the CPU 212 transmits a printer capability information acquisition request to the cloud print service 321.

On the other hand, in a case where the driver associated with the selected printer information is the local printer driver 314 (NO in step S1602), in step S1604, the CPU 212 transmits a capability information acquisition request to the printer 104. According to the present embodiment, the CPU 212 transmits a capability information acquisition request to the inkjet printer 104a in step S1604.

The CPU 212 transmits a capability information acquisition request for the setting items set for the print setting extension application 312 to the cloud print service 321 and to the cloud-print ready printer 104. At this time, capability information on setting items that are not acquired in step S1206 in FIG. 12 is also acquired.

In step S1605, the CPU 212 determines whether the capability information acquisition is completed. At this time, in a case where the capability information acquisition is not completed (NO in step S1605), the CPU 212 waits until the capability information acquisition is completed. In a case where the capability information acquisition is completed (YES in step S1605), the processing proceeds to step S1606.

Steps S1606 to S1621 are similar in processing to steps S1304 to S1319 in FIGS. 13A and 13B, so that redundant descriptions thereof are omitted.

In step S1621, the print data provided to the OS 313 is transmitted to the cloud print service 321 or the printer depending on the type of the printer driver associated with the selected printer information. For example, in a case where the selected printer information corresponds to the electrophotographic printer 104b connected via the cloud print service 321, the OS 313 transmits the print data to the cloud print service 321. The electrophotographic printer 104b receives the print data from the cloud print service 321 and performs print processing. At this time, even in a case where the margins are set at 0 in the printing capability information, the electrophotographic printer 104b adds margins and performs the print processing with the margins. The margins to be added herein are smaller in value than the margins that are set in a case where "expand print region and print" is disabled. On the other hand, in a case where the margins are set in the printing capability information for the received print data, the electrophotographic printer 104b performs the print processing without changing the margin values. By performing the foregoing processing, the electrophotographic printer 104b outputs a sheet without printing in the set regions from the sides of the sheet, and this prevents the sheet from adhering to the conveyor belt.

On the other hand, in a case where the inkjet printer 104a connected without the cloud print service 321 is selected, the OS 313 transmits the print data to the inkjet printer 104a without using the cloud print service 321. The inkjet printer 104a can perform print processing with a margin of zero. Thus, in a case where the margins are set at 0 in the printing capability information for the received print data, an image is printed on a sheet without changing the size of the received image data.

The flowchart illustrating the process of changing wording displayed on the print setting screen depending on the driver associated with the installed print setting extension application 312 and thereafter configuring the print settings selected by the user and generating print data has been described above.

The description of a case where the same print setting extension application 312 is used and a job is transmitted to the electrophotographic printer 104b via the cloud and performs print processing whereas a job is transmitted directly to the inkjet printer 104a via the network and performs print processing according to the embodiment is ended here.

According to the present embodiment, the electrophotographic printer 104b is registered in the cloud print service 321, and the inkjet printer 104a is not registered in the cloud print service 321 and is connected directly to the client terminal 101. Alternatively, the inkjet printer 104a can be registered in the cloud print service 321, and the electrophotographic printer 104b can be connected directly to the client terminal 101.

Even in this case, the print setting extension application 312 displays the IPP attribute PageBorderless as "borderless printing" in a case where the printer selected on the print setting screen is the inkjet printer 104a. Further, in a case where the printer selected on the print setting screen is the electrophotographic printer 104b, the IPP attribute PageBorderless is displayed as "expand print region and print".

OTHER EMBODIMENTS

Further, the inkjet printer 104a and the electrophotographic printer 104b both support cloud printing in the above-described case according to the first embodiment. Further, the electrophotographic printer 104b supports cloud printing and the inkjet printer 104a is locally connected in the above-described case according to the second embodiment. The present invention can be applied to a case where both the inkjet printer 104a and the electrophotographic printer 104b are locally connected. In this case, the print setting extension application 312 can still support both the inkjet printer 104a and the electrophotographic printer 104b. Then, in a case where a printer selected as a candidate for a print data transmission destination is the inkjet printer 104a, the print setting extension application 312 converts the IPP attribute PageBorderless to "borderless printing" and displays the extension print setting screen in FIG. 10C. On the other hand, in a case where a printer selected as a candidate for a print data transmission destination is the electrophotographic printer 104b, the print setting extension application 312 performs the following processing. The print setting extension application 312 converts the IPP attribute PageBorderless to "expand print region and print" and displays the extension print setting screen in FIG. 10D. By performing the foregoing processing, the same IPP attribute can be displayed using different setting item names depending on outputs.

The present invention can be realized also by performing the following processing. Specifically, software (program) for implementing the functions of the above-described embodiments is supplied to a system or an apparatus via a network or various storage media, and a computer (or a CPU or a micro-processing unit (MPU)) of the system or the apparatus reads program codes and executes the read program codes. In this case, the computer program and a storage medium storing the computer program are also included in the present invention.

With the print setting application according to an aspect of the present invention, the same attribute can be displayed differently based on information about a printer selected as a print data transmission destination.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to encompass all such modifications and equivalent structures and functions.

This application claims the benefit of Japanese Patent Application No. 2022-133190, filed Aug. 24, 2022, which is hereby incorporated by reference herein in its entirety.

What is claimed is:

1. A control method that is to be executed by a print setting application installed in an information processing apparatus, the control method comprising:
   in a case where a printer of an electrophotographic printing method is selected as a print data transmission destination, displaying, on a display, a first character string as information of a first function for reducing a margin area around an image based on predetermined characters included in capability information of the printer; and
   in a case where a printer of an inkjet printing method is selected as a print data transmission destination, displaying, on the display, a second character string as information of a second function for reducing the margin area around the image based on the predetermined characters included in the capability information.

2. The control method according to claim 1, further comprising:
   determining, based on the capability information, a printing method of the printer selected as the print data transmission destination.

3. The control method according to claim 2, wherein the capability information is capability information defined by a predetermined protocol.

4. The control method according to claim 1,
   wherein the predetermined characters are Page Borderless.

5. The control method according to claim 4, wherein the predetermined protocol is the Internet Printing Protocol.

6. The control method according to claim 1, wherein the first character string is a character string indicating a function of expanding a print region and printing an image in the expanded print region on a sheet, and
   wherein the second character string is a character string indicating a function of printing an image up to an edge of the sheet.

7. The control method according to claim 1, wherein the print setting application is an application installed in the information processing apparatus based on information about a printer associated with a printer driver configured to generate print data for a plurality of different printers of a plurality of different vendors.

8. The control method according to claim 1, further comprising
setting, based on the first function displayed by the first characters being set to be enabled, a width of the margin area around the image to a width narrower than a width to be set in a case where the first function displayed by the first characters is set to be disabled.

9. A non-volatile storage medium storing a print setting application configured to cause an information processing apparatus to:
in a case where a printer of an electrophotographic printing method is selected as a print data transmission destination, display, on a display, a first character string as information of a first function for reducing a margin area around an image based on predetermined characters included in capability information of the printer; and
in a case where a printer of an inkjet printing method is selected as a print data transmission destination, display, on the display, a second character string as information of a second function for reducing the margin area around the image based on the predetermined characters included in the capability information.

10. The non-volatile storage medium according to claim 9,
wherein the information processing apparatus is further caused to:
determine, based on the capability information, a printing method of the printer selected as the print data transmission destination.

11. The non-volatile storage medium according to claim 10, wherein the capability information is capability information defined by a predetermined protocol.

12. The non-volatile storage medium according to claim 11, wherein the predetermined protocol is an Internet Printing Protocol.

13. The non-volatile storage medium according to claim 9,
wherein the first character string is a character string indicating a function of expanding a print region and printing an image in the expanded print region on a sheet, and
wherein the second character string is a character string indicating a function of printing an image up to an edge of the sheet.

14. The non-volatile storage medium according to claim 9, wherein the print setting application is installed in the information processing apparatus based on information about a printer associated with a printer driver configured to generate print data for two or more different printers of two or more different vendors.

15. The non-volatile storage medium according to claim 9, wherein the predetermined characters are Page Borderless.

16. An information processing apparatus with a print setting application installed therein, the information processing apparatus comprising:
a first display controller that causes, display, in a case where a printer of an electrophotographic printing method is selected as a print data transmission destination, a display, to display a first character string as information of a first function for reducing a margin area around an image based on predetermined characters included in capability information of the printer; and
a second display controller that causes, in a case where a printer of an inkjet printing method is selected as a print data transmission destination, the display to display a second character string as information of a second function based on the predetermined characters included in the capability information.

* * * * *